United States Patent
Zhu et al.

(10) Patent No.: US 12,557,168 B2
(45) Date of Patent: Feb. 17, 2026

(54) SMALL DATA AND RADIO RESOURCE CONTROL TRANSMISSION TO DISAGGREGATED BASE STATION

(71) Applicant: QUALCOMM Incorporated, San Diego, CA (US)

(72) Inventors: Xipeng Zhu, San Diego, CA (US); Gavin Bernard Horn, La Jolla, CA (US); Miguel Griot, La Jolla, CA (US); Ruiming Zheng, Beijing (CN)

( * ) Notice: Subject to any disclaimer, the term of this patent is extended or adjusted under 35 U.S.C. 154(b) by 656 days.

(21) Appl. No.: 17/760,284

(22) PCT Filed: Mar. 24, 2020

(86) PCT No.: PCT/CN2020/080841
§ 371 (c)(1),
(2) Date: Aug. 5, 2022

(87) PCT Pub. No.: WO2021/189239
PCT Pub. Date: Sep. 30, 2021

(65) Prior Publication Data
US 2023/0071486 A1    Mar. 9, 2023

(51) Int. Cl.
*H04W 4/00* (2018.01)
*H04W 76/27* (2018.01)

(52) U.S. Cl.
CPC .................... *H04W 76/27* (2018.02)

(58) Field of Classification Search
CPC .................................................... H04W 76/27
See application file for complete search history.

(56) References Cited

U.S. PATENT DOCUMENTS

| | | | |
|---|---|---|---|
| 12,016,059 B2* | 6/2024 | Kim | H04W 76/30 |
| 2018/0139778 A1 | 5/2018 | Chou et al. | |
| 2019/0223221 A1* | 7/2019 | Johansson | H04W 68/02 |

FOREIGN PATENT DOCUMENTS

| | | | | |
|---|---|---|---|---|
| CN | 107645779 A | 1/2018 | | |
| CN | 107889274 A | 4/2018 | | |
| CN | 108271125 A | 7/2018 | | |
| EP | 4075880 A1 * | 10/2022 | | H04W 52/0216 |
| WO | WO-2019217829 A1 | 11/2019 | | |
| WO | WO-2020036460 A1 * | 2/2020 | | H04W 76/11 |
| WO | WO-2020191059 A1 * | 9/2020 | | H04W 76/27 |
| WO | WO-2021062733 A1 * | 4/2021 | | H04W 72/1268 |

OTHER PUBLICATIONS

International Search Report and Written Opinion—PCT/CN2020/080841—ISA/EPO—Dec. 15, 2020.

(Continued)

*Primary Examiner* — Elisabeth Benoit Magloire

(57) ABSTRACT

Methods, systems, and devices for wireless communications are described. A user equipment (UE) may establish a wireless connection between the UE and a base station. The UE may identify, in an inactive state for the UE for the wireless connection, data to transmit to the base station. The UE may transmit, in the inactive state, a medium access control protocol data unit, the medium access control protocol data unit comprising both a data packet for the identified data and a request to resume an active state for the wireless connection.

35 Claims, 17 Drawing Sheets

(56) References Cited

OTHER PUBLICATIONS

Qualcomm Incorporated: "Small Data Transmission in Inactive State", 3GPP Draft, R3-170158, 3GPP TSG-RAN WG3 NR Ad Hoc Meeting, Small Data Transmission in Inactive State V3, 3rd Generation Partnership Project (3GPP), Mobile Competence Centre, 650, Route Des Lucioles, F-06921 Sophia-Antipolis Cedex, France, vol. RAN WG3, No. Spokane, Washington; Jan. 17, 2017-Jan. 19, 2017, Jan. 12, 2017, XP051212812, Retrieved from the Internet: URL:http://www.3gpp.org/ftp/Meetings_3GPP_SYNC/RAN3/Docs/ [retrieved on Jan. 12, 2017], part 2, 4 pages.
Samsung: "Overall Procedure for Data Transfer in Inactive State", 3GPP TSG-RAN WG2 Meeting #6 R2-168051, 3rd Generation Partnership Project, Mobile Competence Centre, 650, Route Des Lucioles, F-06921 Sophia-Antipolis Cedex, France, vol. RAN WG2, No. Reno, USA, Nov. 14-18, 2016, Nov. 14, 2016-Nov. 18, 2016, XP051192344, pp. 1-6. Section 2.1-2.2.
Supplementary European Search Report—EP20926947—Search Authority—Berlin—Nov. 24, 2023.

\* cited by examiner

SMALL DATA AND RADIO RESOURCE CONTROL TRANSMISSION TO DISAGGREGATED BASE STATION

CROSS REFERENCE

The present application is a 371 national stage filing of International PCT Application No. PCT/CN2020/080841 by Zhu et al. entitled "SMALL DATA AND RADIO RESOURCE CONTROL TRANSMISSION TO DISAGGREGATED BASE STATION," filed Mar. 24, 2020, which is assigned to the assignee hereof, and which is expressly incorporated by reference in its entirety herein.

FIELD OF TECHNOLOGY

The following relates generally to wireless communications and more specifically to small data and radio resource control transmissions to disaggregated base stations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support small data and radio resource control (RRC) transmissions to disaggregated base stations. Generally, the described techniques provide various mechanisms to improve a small data transfer for a user equipment (UE) while operating in an inactive state, such as a RRC inactive or idle state. Aspects of the described techniques may be applicable for a disaggregated base station, such as a base station configured with a central unit (CU)/distributed unit (DU) split architecture/functionality. For example, the base station and UE may establish a wireless connection. While operating in an inactive state, the UE may identify or otherwise determine that that it has data to transmit to the base station. In some aspects, the data in this context may refer to a small data transfer, such as an amount or quantity of data at or below a threshold. The UE may transmit or otherwise convey, while in the inactive state, a medium access control (MAC) protocol data unit (PDU) to the base station that includes both of a data packet carrying the data in a request to resume an active state for the wireless connection (e.g., in a RRC resume request message). The MAC PDU may be received at a first network node of the base station (e.g., at the DU) and the data of the receive data packet may be transmitted to a second network node of the base station (e.g., to the CU). Accordingly, the small data transfer may be carried in an RRC resume request message while the UE operates in the inactive state.

A method of wireless communication at a UE is described. The method may include establishing a wireless connection between the UE and a base station, identifying, in an inactive state for the UE for the wireless connection, data to transmit to the base station, and transmitting, in the inactive state, a MAC PDU, the MAC PDU including both a data packet for the identified data and a request to resume an active state for the wireless connection.

An apparatus for wireless communication at a UE is described. The apparatus may include a processor, memory coupled with the processor, and instructions stored in the memory. The instructions may be executable by the processor to cause the apparatus to establish a wireless connection between the UE and a base station, identify, in an inactive state for the UE for the wireless connection, data to transmit to the base station, and transmit, in the inactive state, a MAC PDU, the MAC PDU including both a data packet for the identified data and a request to resume an active state for the wireless connection.

Another apparatus for wireless communication at a UE is described. The apparatus may include means for establishing a wireless connection between the UE and a base station, identifying, in an inactive state for the UE for the wireless connection, data to transmit to the base station, and transmitting, in the inactive state, a MAC PDU, the MAC PDU including both a data packet for the identified data and a request to resume an active state for the wireless connection.

A non-transitory computer-readable medium storing code for wireless communication at a UE is described. The code may include instructions executable by a processor to establish a wireless connection between the UE and a base station, identify, in an inactive state for the UE for the wireless connection, data to transmit to the base station, and transmit, in the inactive state, a MAC PDU, the MAC PDU including both a data packet for the identified data and a request to resume an active state for the wireless connection.

In some examples of the method, apparatuses, and non-transitory computer-readable medium described herein, transmitting the MAC PDU may include operations, features, means, or instructions for transmitting a resume request message that includes the request to resume the active state for the wireless connection and the data packet, the MAC PDU including the resume request message.

In some examples of the method, apparatuses, and non-transitory computer-readable medium described herein, the request to resume the active state for the wireless connection includes a first type of RRC resume request message, and the resume request message includes a second type of RRC resume request message.

Some examples of the method, apparatuses, and non-transitory computer-readable medium described herein may further include operations, features, means, or instructions for transmitting, in the MAC PDU, an identifier of a data radio bearer associated with the data, or a logical channel identifier associated with the data, or both.

In some examples of the method, apparatuses, and non-transitory computer-readable medium described herein, transmitting the MAC PDU may include operations, features, means, or instructions for transmitting a set of data packets in the MAC PDU, the set of data packets including the data packet.

In some examples of the method, apparatuses, and non-transitory computer-readable medium described herein, the data packet includes a packet data convergence protocol PDU.

In some examples of the method, apparatuses, and non-transitory computer-readable medium described herein, transmitting the MAC PDU may include operations, features, means, or instructions for transmitting a packet that includes the request to resume the active state for the wireless connection and the data packet, the MAC PDU including the packet.

In some examples of the method, apparatuses, and non-transitory computer-readable medium described herein, the data packet includes a media access control sub-PDU that includes the data.

In some examples of the method, apparatuses, and non-transitory computer-readable medium described herein, the request to resume the active state for the wireless connection includes a media access control sub-PDU that includes a RRC resume request message.

In some examples of the method, apparatuses, and non-transitory computer-readable medium described herein, each data packet of the set of data packets may be associated with an identifier of a data radio bearer, or a logical channel identifier, or both.

In some examples of the method, apparatuses, and non-transitory computer-readable medium described herein, the MAC PDU may be transmitted to a first network node of the base station with which the UE established the wireless connection, where the first network node includes a distributed unit of the base station.

In some examples of the method, apparatuses, and non-transitory computer-readable medium described herein, the wireless connection includes a RRC connection, the inactive state includes a RRC inactive state, and the active state includes a RRC connected state.

A method of wireless communication at a base station is described. The method may include establishing a wireless connection between the base station and a UE, receiving, at a first network node of the base station and in an inactive state for the UE for the wireless connection, a MAC PDU from the UE, the MAC PDU including both a data packet and a request to resume an active state for the wireless connection, and transmitting data of the received data packet to a second network node of the base station.

An apparatus for wireless communication at a base station is described. The apparatus may include a processor, memory coupled with the processor, and instructions stored in the memory. The instructions may be executable by the processor to cause the apparatus to establish a wireless connection between the base station and a UE, receive, at a first network node of the base station and in an inactive state for the UE for the wireless connection, a MAC PDU from the UE, the MAC PDU including both a data packet and a request to resume an active state for the wireless connection, and transmit data of the received data packet to a second network node of the base station.

Another apparatus for wireless communication at a base station is described. The apparatus may include means for establishing a wireless connection between the base station and a UE, receiving, at a first network node of the base station and in an inactive state for the UE for the wireless connection, a MAC PDU from the UE, the MAC PDU including both a data packet and a request to resume an active state for the wireless connection, and transmitting data of the received data packet to a second network node of the base station.

A non-transitory computer-readable medium storing code for wireless communication at a base station is described. The code may include instructions executable by a processor to establish a wireless connection between the base station and a UE, receive, at a first network node of the base station and in an inactive state for the UE for the wireless connection, a MAC PDU from the UE, the MAC PDU including both a data packet and a request to resume an active state for the wireless connection, and transmit data of the received data packet to a second network node of the base station.

In some examples of the method, apparatuses, and non-transitory computer-readable medium described herein, receiving the MAC PDU may include operations, features, means, or instructions for receiving a resume request message that includes the request to resume the active state for the wireless connection and the data packet, the MAC PDU including the resume request message.

In some examples of the method, apparatuses, and non-transitory computer-readable medium described herein, the request to resume the active state for the wireless connection includes a first type of RRC resume request message, and the resume request message includes a second type of RRC resume request message.

In some examples of the method, apparatuses, and non-transitory computer-readable medium described herein, the data packet includes a packet data convergence protocol PDU.

In some examples of the method, apparatuses, and non-transitory computer-readable medium described herein, receiving the MAC PDU may include operations, features, means, or instructions for receiving a packet that includes the request to resume the active state for the wireless connection and the data packet, the MAC PDU including the packet.

In some examples of the method, apparatuses, and non-transitory computer-readable medium described herein, the data packet includes a media access control sub-PDU that includes the data.

In some examples of the method, apparatuses, and non-transitory computer-readable medium described herein, the request to resume the active state for the wireless connection includes a MAC sub-PDU that includes a RRC resume request message.

Some examples of the method, apparatuses, and non-transitory computer-readable medium described herein may further include operations, features, means, or instructions for receiving, in the MAC PDU, an identifier of a data radio bearer associated with the data, or a logical channel identifier associated with the data, or both.

In some examples of the method, apparatuses, and non-transitory computer-readable medium described herein, receiving the MAC PDU may include operations, features, means, or instructions for receiving a set of data packets in the MAC PDU, the set of data packets including the data packet.

In some examples of the method, apparatuses, and non-transitory computer-readable medium described herein, each data packet of the set of data packets may be associated with an identifier of a data radio bearer, or a logical channel identifier, or both.

In some examples of the method, apparatuses, and non-transitory computer-readable medium described herein, the first network node may include operations, features, means, or instructions for forwarding the received data packet to a central unit of the base station, the second network node including the central unit.

In some examples of the method, apparatuses, and non-transitory computer-readable medium described herein, the central unit includes a central unit control-plane of the base station, and the central unit control-plane forwards the received data packet from the central unit control-plane to a central unit user-plane of the base station.

In some examples of the method, apparatuses, and non-transitory computer-readable medium described herein, the central unit includes a central unit user-plane of the base station that processes the received data packet to recover the data, and forwards the recovered data to a user-plane function of the network.

In some examples of the method, apparatuses, and non-transitory computer-readable medium described herein, processing the received data packet to recover the data may include operations, features, means, or instructions for reading a quality-of-service flow identifier from the data packet, deriving a data radio bearer identifier for the data packet based on the quality-of-service flow identifier, and deciphering the data packet based on the data radio bearer identifier and a security context associated with the UE.

Some examples of the method, apparatuses, and non-transitory computer-readable medium described herein may further include operations, features, means, or instructions for transmitting, to the second network node, a message indicating the request to resume the active state for the wireless connection, the message including an indication of the data of the received data packet, where the data of the received data packet may be transmitted to the second network node based on the indication of the data.

In some examples of the method, apparatuses, and non-transitory computer-readable medium described herein, the message further includes an identifier of a data radio bearer associated with the data, or a logical channel identifier associated with the data, or both.

In some examples of the method, apparatuses, and non-transitory computer-readable medium described herein, the wireless connection includes a RRC connection, the inactive state includes a RRC inactive state, and the active state includes a RRC connected state.

DETAILED DESCRIPTION

Figure 1:
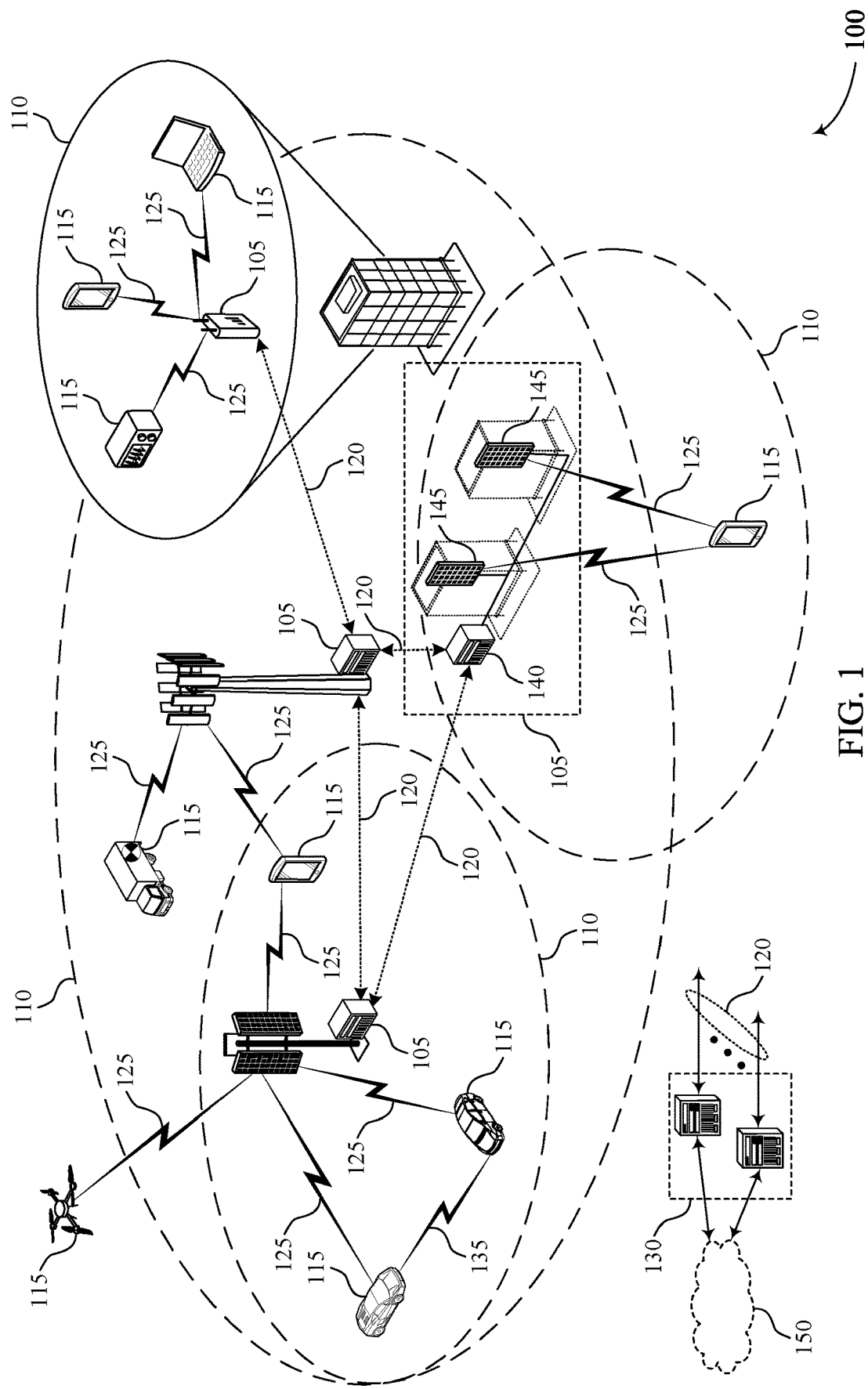
FIG. 1 illustrates an example of a system for wireless communications that supports small data and radio resource control (RRC) transmissions to disaggregated base stations in accordance with aspects of the present disclosure.

User equipment (UE) operating in a wireless communication system may operate in a radio resource control (RRC) connected state, an RRC inactive state, and an RRC idle state. The RRC connected state is typically associated with a full set of control channels, channel performance measurement and reporting, acknowledgment feedback messaging, and the like, being configured for the UE (which can exhaust considerable resources and increase complexity/cost of the UE). In the RRC idle state, the UE powers down various components to conserve power while the base station releases most of the resources configured for the UE. In the RRC inactive state, the network and UE may maintain some degree of context (e.g., access stratum context) which is used to more quickly transition the UE to an RRC connected state should there be data to communicate. While these RRC modes support many operations, they are limited in that they do not provide the flexibility warranted by certain types of UEs, by certain types of wireless communication needs, and the like. For example, it may be inefficient for a UE to transition to an RRC connected state when the UE only has a small amount of data to communicate to its base station. Accordingly, aspects of the described techniques provide various mechanisms that improve techniques for, and efficiency of, communicating small data while the UE operates in the RRC inactive state.

Aspects of the disclosure are initially described in the context of wireless communications systems. Generally, the described techniques provide various mechanisms to improve a small data transfer for a user equipment (UE) while operating in an inactive state, such as a RRC inactive or idle state. Aspects of the described techniques may be applicable for a disaggregated base station, such as a base station configured with a central unit (CU)/distributed unit (DU) split architecture/functionality. For example, the base station and UE may establish a wireless connection. While operating in an inactive state, the UE may identify or otherwise determine that that it has data to transmit to the base station. In some aspects, the data in this context may refer to a small data transfer, such as an amount or quantity of data at or below a threshold. The UE may transmit or otherwise convey, while in the inactive state, a medium access control (MAC) protocol data unit (PDU) to the base station that includes both of a data packet carrying the data in a request to resume an active state for the wireless connection (e.g., in a RRC resume request message). The MAC PDU may be received at a first network node of the base station (e.g., at the DU) and the data of the receive data packet may be transmitted to a second network node of the base station (e.g., to the CU). Accordingly, the small data transfer may be carried in an RRC resume request message while the UE operates in the inactive state.

Aspects of the disclosure are further illustrated by and described with reference to apparatus diagrams, system diagrams, and flowcharts that relate to small data and RRC transmissions to disaggregated base stations.

FIG. 1 illustrates an example of a wireless communications system 100 that supports small data and RRC transmissions to disaggregated base stations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may establish a wireless connection between the UE 115 and a base station 105. The UE 115 may identify, in an inactive state for the UE 115 for the wireless connection, data to transmit to the base station 105. The UE 115 may transmit, in the inactive state, a medium access control protocol data unit, the medium access control protocol data unit comprising both a data packet for the identified data and a request to resume an active state for the wireless connection.

A base station 105 may establishing a wireless connection between the base station 105 and a UE 115. The base station 105 may receive, at a first network node of the base station 105 and in an inactive state for the UE 115 for the wireless connection, a medium access control protocol data unit from the UE 115, the medium access control protocol data unit comprising both a data packet and a request to resume an active state for the wireless connection. The base station 105 may transmit data of the received data packet to a second network node of the base station 105.

Figure 2:
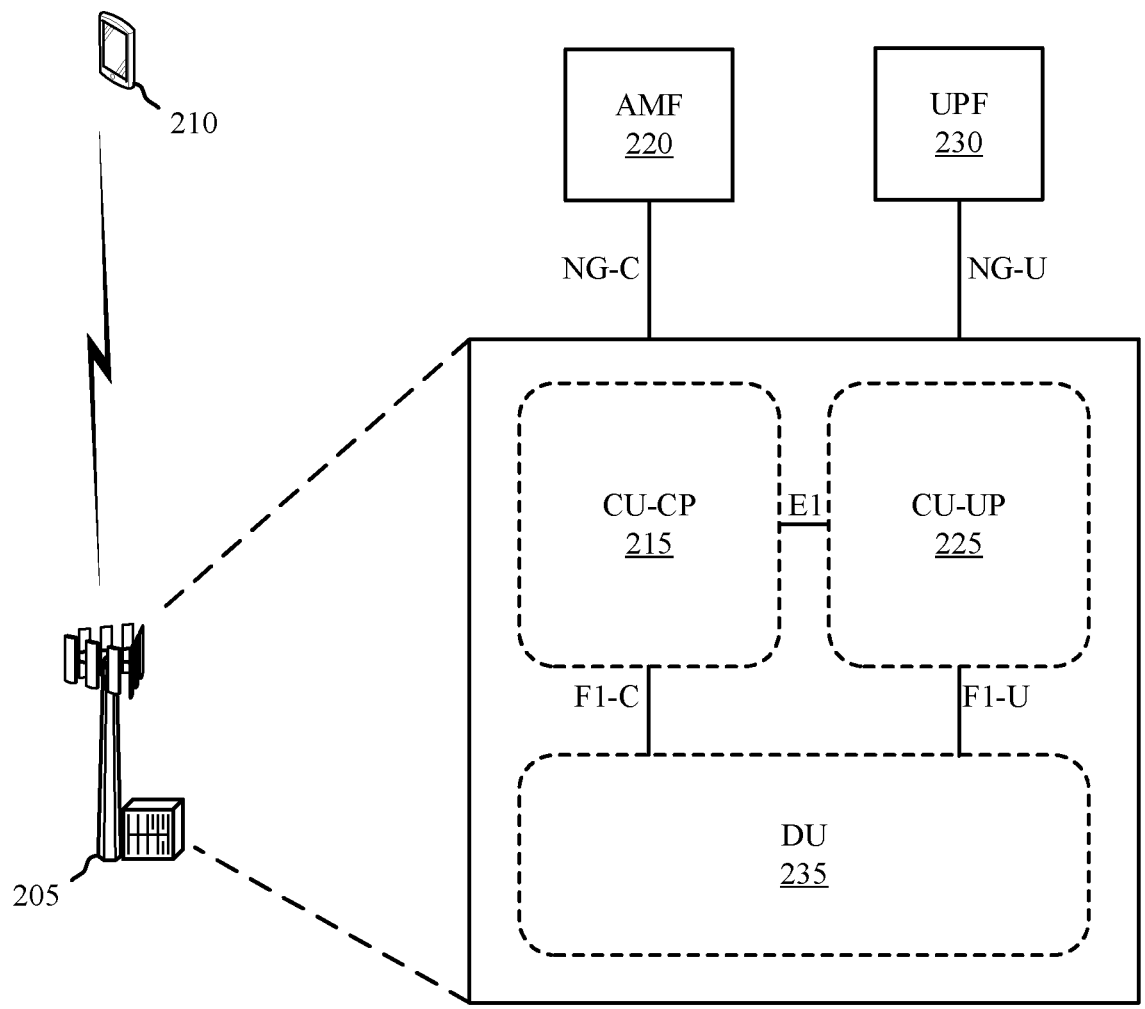
FIG. 2 illustrates an example of a wireless communication system that supports small data and RRC transmissions to disaggregated base stations in accordance with aspects of the present disclosure.

FIG. 2 illustrates an example of a wireless communication system 200 that supports small data and RRC transmissions to disaggregated base stations in accordance with aspects of the present disclosure. In some examples, wireless communication system 200 may implement aspects of wireless communication system 100. Wireless communication system 200 may include base station 205, UE 210, an access and mobility management function (AMF) 220, and/or a user plane function (UPF) 230, which may be examples of corresponding devices described herein. In some aspects, AMF 220 and UMF 230 may be components of a core network, such as core network 130 discussed above.

In some aspects, base station 205 may be a disaggregated base station configured with CU/DU split. Base station 205 may communicate with AMF 220 and/or UPF 230 via an NG interface. Base station 205 may communicate with AMF 220 via an NG interface in the control plane (NG-C) and with UPF 230 via an NG interface in the user plane (NG-U). Broadly, AMF 220 may monitor, control, or otherwise manage one or more aspects of termination of the radio access network (RAN) control plane interface, termination of network access stratum (NAS) interface for NAS ciphering and integrity protection, mobility management, connection management, and the like, within the core network and for base station 205. UPF 230 may monitor, control, or otherwise manage one or more aspects of packet routing and forwarding, packet inspection, quality of service handling for user plane, anchor point for intra-/inter-radio access technology (RAT) mobility (when applicable), and the like, for the core network and for base station 205.

Generally, base station 205 illustrates one non-limiting example of a functional split architecture that may be employed in a wireless device and used for performing wireless communications over wireless communication system 200. In one example, base station 205 may be an example of a base station that is configured using a CU/DU functional split. However, it is to be understood that base station 205 may also be implemented (at least in some aspects) as a UE (such as UE 210) configured such that one or more protocol layer functions are performed in different components, processes, functionalities, and the like, within the UE. In some aspects, base station 205 may be a component within an integrated access and backhaul (IAB) network. For example, base station 205 may be an anchor node within the IAB network having a wired connection to the core network or may be an access node within the IAB network connecting to an anchor node via a wireless channel within the IAB network.

Generally, base station 205 may include a CU, which may include CU 215 that manages aspects of communications in the control plane (CU-CP) and a CU 225 that manages aspects of communications in the user plane (CU-UP). Base station 205 may also include a DU 235. When base station 205 is implemented as a base station (e.g., rather than a UE acting as a base station within an IAB network), the functional split between the CU and the DU may be implemented as a split between an access node controller and a smart radio head. However, it is to be understood that the functional split configuration illustrated in base station 205 is only one example of how the functional split may be implemented, but that other functional split configurations may also be supported.

In the control plane, CU 215 may implement aspects of an RRC layer, a PDCP layer, and the like. In the user plane, CU 225 may implement aspects of a service data adaptation protocol (SDAP) layer, a PDCP layer, and the like. The CU 215 and the CU 225 may interface or otherwise communicate with each other via an E1 interface. The DU 235 may implement aspects of an RLC layer, a MAC layer, and a physical layer. The DU 235 may interface or otherwise communicate with the CU 215 in the control plane via an F1-C interface and with the CU 225 in the user plane via an F1-U interface. In some aspects, UE 210 may establish a connection with base station 205 via DU 235 and/or the CU (e.g., CU 215 and/or CU 225).

In some aspects, UE 210 operating in a wireless communication system may operate in a RRC connected state, an RRC inactive state, and an RRC idle state. The RRC connected state is typically associated with a full set of control channels, channel performance measurement and reporting, acknowledgment feedback messaging, and the like, being configured for UE 210 (which can exhaust considerable resources and increase complexity/cost of UE 210). In the RRC idle state, UE 210 powers down various components/functions to conserve power while base station 205 releases most of the resources configured for UE 210. In the RRC inactive state, the network and UE 210 may maintain some degree of context (e.g., access stratum context) which is used to more quickly transition the UE 210 to an RRC connected state should there be data to communicate. While these RRC modes support many operations, they are limited in that they do not provide the flexibility warranted by certain types of UEs, by certain types of wireless communication needs, and the like. For example, it may be inefficient for UE 210 to transition to an RRC connected state when UE 210 only has a small amount of data to communicate.

Previous attempts to configure UE 210 for a small data transfer typically focus on UE 210 including the small data in a random access channel (RACH) message. For example, some wireless communication systems are configured such that UE 210 can include the small data in a RACH message A (msgA) in a two-step RACH process and/or in a RACH message 3 (msg3) in a four-step RACH process. Other attempts include UE 210 transmitting the small data on a pre-configured PUSCH resource (e.g., re-using a configured grant) when UE 210 has a valid timing advance with respect to base station 205. However, these attempts may be insufficient when the base station that UE 210 is connected to is a disaggregated base station (e.g., a base station implementing a CU/DU split), such as base station 205. Accordingly, aspects of the described techniques provide various mechanisms that improve techniques for, and efficiency of, communicating small data to a disaggregated base station while UE 210 operates in the RRC inactive state.

For example, base station 205 and UE 210 may have an established connection over a wireless channel (e.g., an RRC connection). The connection may be considered an access link within an IAB network. UE 210, while operating in the RRC inactive state, may determine or otherwise identify that it has data to transmit to base station 205. For example, UE 210 may receive uplink data in its buffer to be communicated. Accordingly, UE 205 may transmit, while still operating in the RRC inactive state, a MAC PDU to base station 205 that carries or otherwise conveys the data packet for the identified data and a request to resume an active state for the wireless connection. In some aspects, the request to resume inactive state for the wireless connection may be an example of an RRC resume request message (e.g., RRCResumeRequest) that carries or otherwise conveys an indication of the data and/or the data. The RRC resume request message may use an existing message format (e.g., reusing one or more fields within the RRC resume request message format) and/or may be a new format for an RRC resume request message (e.g., add one or more bits, fields, etc.). In some examples, the RRC resume request message may be a message type that implicitly and/or explicitly indicates that it carries small data for UE 210 and/or that UE 210 has small data to communicate. UE 210 may transmit the MAC PDU to DU 235 (e.g., a first network node in this example) of base station 205. DU 235 may then transmit, forward, or otherwise convey data of the receive data packet to a second network node of base station 205. In some examples, the second network node may be CU 215 (e.g., in the control plane) or CU 225 (e.g., in the user plane) of base station 205.

That is, in one example DU 235 may transmit or otherwise convey the data (or data packet) to CU 215, which disassembles the RRC message and the data carried therein. In this example, CU 215 may transmit the data to CU 225 (e.g., in a bearer context modification request message). CU 225 may transmit the data to UPF 230 over the NG-U interface. That is, UE 210 may transmit or otherwise convey the resume request message to base station 205 that includes the request to resume the active state for the wireless connection and the data packet. In this context, the MAC PDU is the resume request message. In some aspects, different types of RRC resume request messages may be employed. For example, a first RRC resume request message may be used as the request to resume the active state (e.g., the RRC active state) for the wireless connection, while a second RRC resume request message may be used for the resume request message. In some aspects, the MAC PDU may carry or otherwise convey an identifier of a data radio bearer (DRB) associated with the data and/or a logical channel identifier (LCID) associated with the data. When UE 210 has multiple data packets to transmit, the MAC PDU may include a set of data packets, with each data packet is carried in a PDCP PDU.

Accordingly, in this example the described techniques provide for UE 210 to transmit small data to DU 235 inside an RRC message (e.g., the RRC resume request message). A new RRC resume request message (e.g., RRCResumeRequest2) may be defined to carry the original RRC resume request message information as well as the PDCP PDU with the user data. In some aspects, UE 210 may include a QFI and the PDCP PDU (e.g., even if the DRB only has one QoS flow). RRC processing may be applied based on the default configuration (e.g., processing the RRC resume request message). DU 235 forwards the received RRC resume request message to CU 215, which disassembles the data from the RRC message and forwards the data to CU 225. For example, the data may be carried in a bearer context modification request message. CU 225 process of the data and then forwards it to UPF 230. For example, CU 225 may read the QFI from the PDCP PDU, derive the DRB identifier from the QFI, decipher the PDU (e.g., the data) using existing security key(s) and the DRB identifier, and then forward the SDAP payload to UPF 230.

In some aspects of this example, alternatives may be used to avoid the impact to the user plane protocols (e.g., PDCP, SDAP, etc.). In one alternative, the DRB identifier can be included in the new RRC message RRCResumeRequest (e.g., RRCResumeRequest, DRB-ID/LCID, PDCP PDU) transmitted from UE 210. In another alternative, CU 225 may directly send the PDCP PDU to CU 215 via the general packet radio service (GPRS) tunneling protocol (GTP)-U tunnel of the DRB. The DRB may be suspended in CU 215 when UE 210 is operating in the RRC inactive state. The bearer modification procedure may be needed to resume the DRB before sending data via the GTP-U tunnel.

In some aspects of this example, multiple data PDUs (e.g., a set of data packets) may be allowed in the RRC message (e.g., in the request to resume the active state for the wireless connection message). In this example, data disassembling and forwarding may be performed multiple times by the associated components of base station 205. One alternative to this approach is that each PDU may have an associated DRB identifier or LCD.

In other aspects of this example, base station 205 may not be an anchor base station. That is, UE 210 may connect to base station 205 via an access link, which then forwards communications upstream via one or more intermediate IAB node hops to the anchor base station. In this context, UE 210 may transmit the MAC PDU including the data packet for the identified data and the request to resume the active state for the wireless connection to DU 235 of base station 205. DU 235 may forward the RRC message to CU 215, which may forward the data to its counterpart CU-CP function within the anchor base station.

In another example, DU 235 may transmit or otherwise convey the data (or data packet) to CU 225. That is, DU 235 may disassemble the RRC message and the data, and then transmit or otherwise convey a data pending indication to CU 215. DU 235, CU 215, and/or CU 225 may exchange various context request/response messages, and then DU 235 may transmit the data to CU 225 (e.g., in a PDCP PDU). In some aspects, this may include UE 210 transmitting a packet that includes a request to resume the active state for the wireless connection and the data packet. In this example, the MAC PDU is the data packet. In some aspects, the data packet may be conveyed in a MAC sub-PDU that includes the data. In this example, the request to resume the active state for the wireless connection may include a MAC sub-PDU that includes an RRC resume request message. In this context, each data packet of the set of data packets may be associated with a DRB identifier and/or a LCID associated with the data.

In this example, UE 210 may transmit the MAC PDU within an RRC sub-PDU and data in a sub-PDU to DU 235. DU 235 disassembles the RRC message and the data. Radio link control (RLC) processing may be applied to both the RRC message and the data using default RLC configurations. DU 235 then initiates the RRC resume procedure, which may include DU 235 indicating that data is pending to CU 215. DU 235 may also indicate the DRB identifier/LCID of the pending data to CU 215. The uplink tunnel endpoint identifier (TEID) may be received in the UE context request message. DU 235 may forward the PDCP PDU to CU 225 using the uplink TEID. CU 225 processes the data and forwards the data to UPF 230. For example, CU 225 may decrypt the data using existing security keys and forward the SDAP payload to UPF 230.

In other aspects of this example, base station 205 may not be an anchor base station. That is, UE 210 may connect to base station 205 via an access link, which then forwards communications upstream via one or more intermediate IAB node hops to the anchor base station. In this context, DU 235 may forward the RRC message to CU 215 along with a data pending indication and the DRB identifier/LCID. CU 215 may send the UE context retrieval request message to its counterpart CU-CP function at the anchor base station (e.g., with an uplink data pending indication). If the anchor base station CU-CP determines to perform an anchor relocation (e.g., to move base station 205 to a new anchor base station), the UE context may be transferred to CU 215 in the UE context retrieval response message. In this situation, CU 215 may update the user plane in coordination with CU 225 and/or UPF 230. In the situation where no anchor relocation is performed, the CU-CP function of the anchor base station may reply to the UE context retrieval message with a UE context retrieval failure indication. The CU-CP function of the anchor base station may also indicate the GTP-U tunnel information for DU 235 to forward the uplink data. The GTP-U tunnel information may be indicated either inside the UE context retrieval failure message and/or via a backhaul message (e.g., an Xn-U address indication message).

Figure 3:
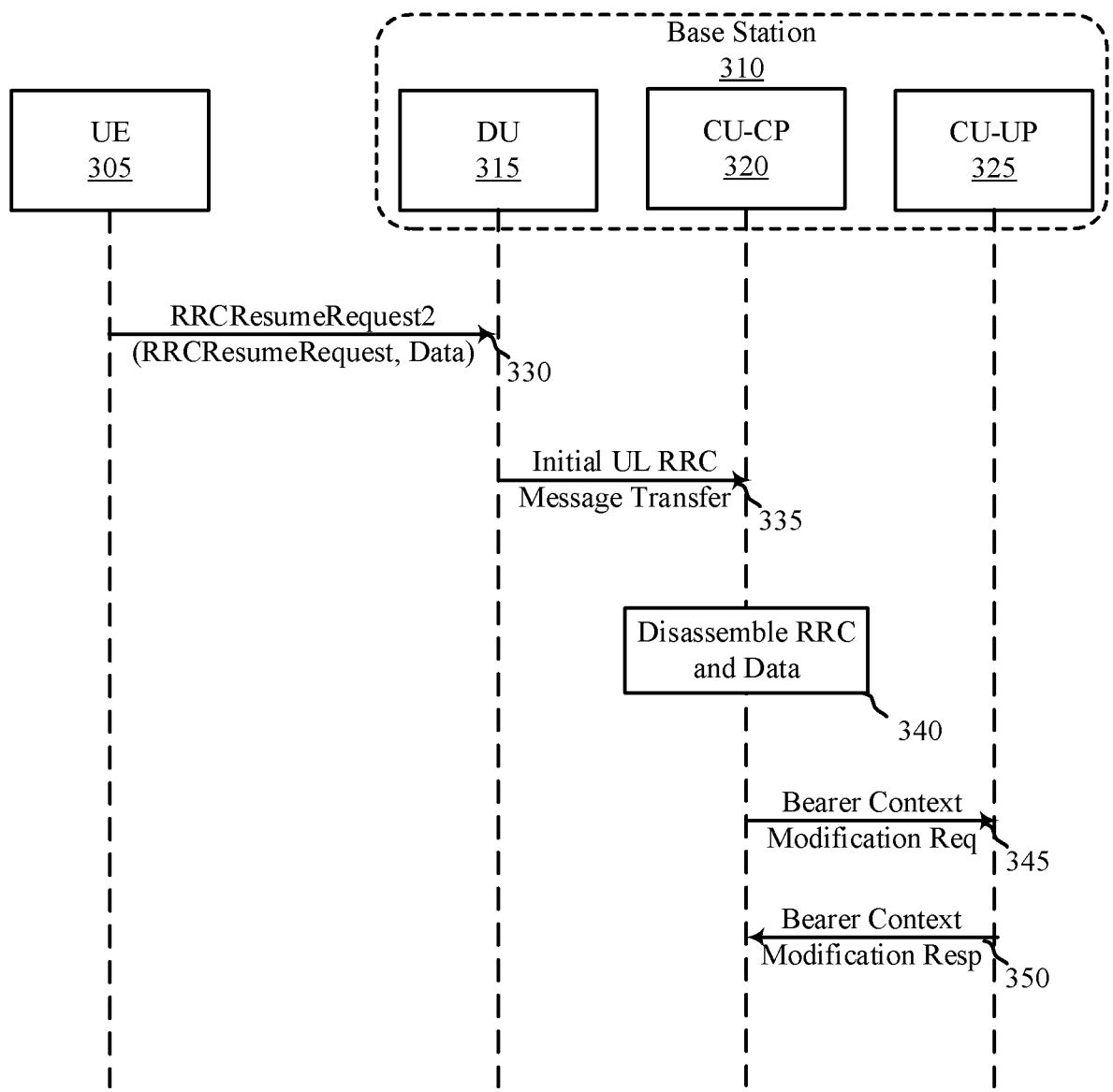
FIG. 3 illustrates an example of a process that supports small data and RRC transmissions to disaggregated base stations in accordance with aspects of the present disclosure.

FIG. 3 illustrates an example of a process 300 that supports small data and RRC transmissions to disaggregated base stations in accordance with aspects of the present disclosure. In some examples, process 300 may implement aspects of wireless communication systems 100 and/or 200. Aspects of process 300 may be implemented by UE 305 and/or base station 310, which may be examples of corresponding devices described herein. In some aspects, base station 310 may be a disaggregated base station implementing a CU/DU split architecture. That is, base station 310 may include a DU 315, a CU-CP 320, and/or a CU-UP 325, which may be examples of the corresponding devices described herein. Generally UE 305 and base station 310 may have a wireless connection established to support wireless communications.

At 330, UE 305 may transmit (and DU 315 of base station 310 may receive) a MAC PDU that includes both the data packet and a request to resume an active state for the wireless connection. In this context, DU 315 may be considered a first network node of base station 310. That is, UE 305 may transmit or otherwise convey an indication of an RRC resume request message that also includes uplink data to be communicated from UE 305. As discussed above, an existing RRC resume request message may be utilized to carry the data and/or a new RRC resume request message may be defined that carries the original RRC resume request information as well as the PDCP PDU with the user data. In some aspects, UE 305 may include the QFI in the PDCP PDU, even in the situation where the DRB only has one QoS flow. As discussed above, in some examples the RRC resume request message may include or otherwise convey an indication of the DRB identifier/LCID, PDCP PDU, and the like.

At 335, DU 315 (e.g., the first network node a base station 310) may transmit or otherwise provide the data of the receive data packet to CU-CP 320. In this context, CU-CP 320 may be considered a second network node of base station 310. In some aspects, this may include DU 315 transmitting an initial uplink RRC message transfer to CU-CP 320. That is, the data may be carried in the initial uplink RRC message transfer from DU 315.

At 340, CU-CP 320 may disassemble the RRC message and data. That is, CU-CP 320 may separate the RRC message (e.g., the request to resume the active state for the wireless connection) and the data packet for the identified data.

At 345, CU-CP 320 may transmit, provide, or otherwise convey the data to CU-UP 325. For example, the data may be carried in a bearer context modification request message transmitted or otherwise provided from CU-CP 320 to CU-UP 325. CU-UP 325 may generally process the data and then forward the data to a UPF function of the core network. For example, CU-UP 325 may read the QFI from the PDCP PDU, derive or otherwise determine a DRB identifier based on the QFI, decipher the PDU using existing security keys of UE 305 and the derived DRB identifier, and then forward the SDAP payload to the UPF function of the core network. As discussed above, in some examples CU-CP 320 may send the PDCP PDU to CU-UP 325 via the GTP-U tunnel of the DRB.

At 350, CU-UP 325 may transmit, provide, or otherwise convey, a bearer context modification response message to CU-CP 320. In some aspects, the bearer context response message may utilize conventional formatting configurations and/or may convey an indication that CU-UP 325 has successfully forwarded the data to the UPF.

Figure 4:
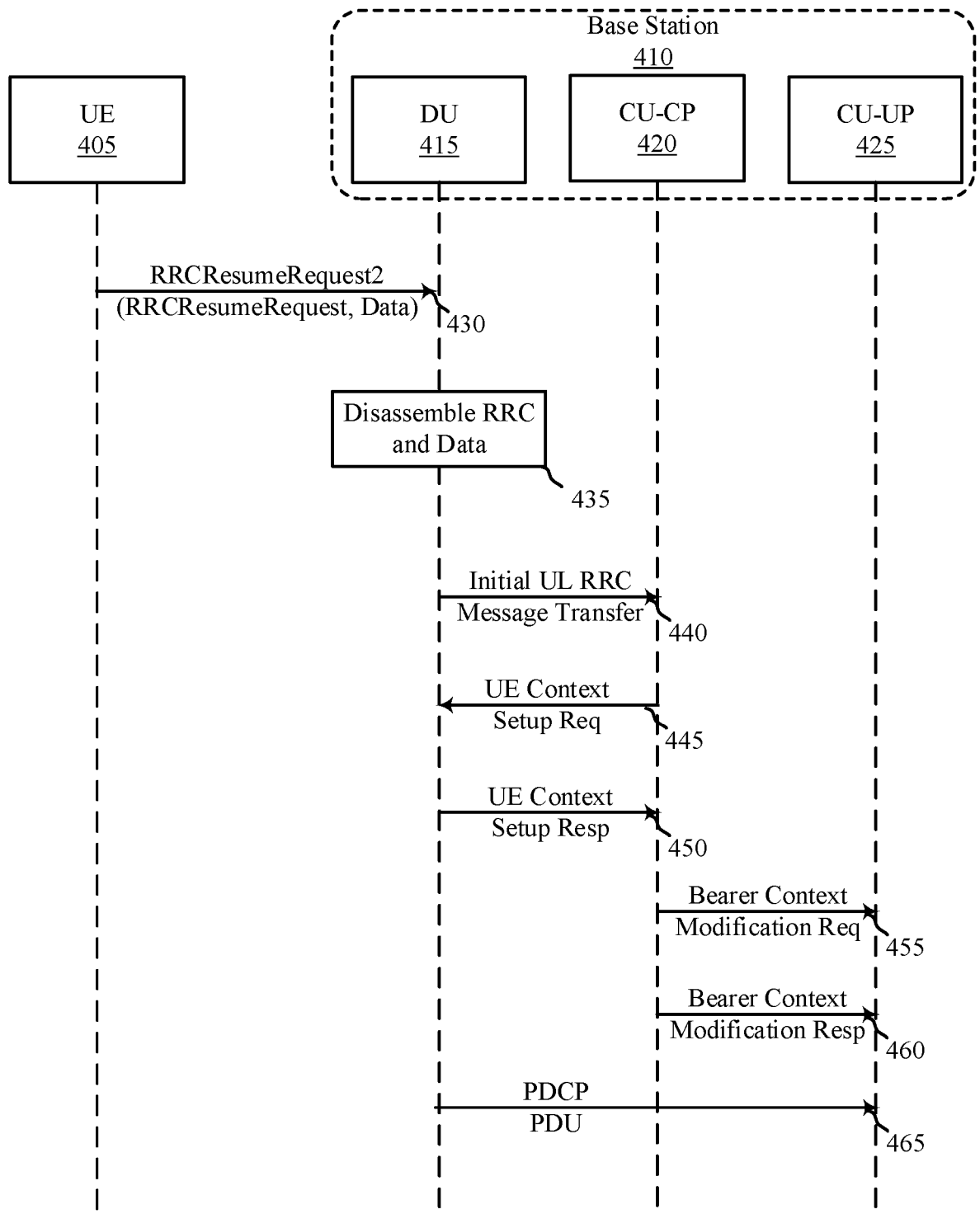
FIG. 4 illustrates an example of a process that supports small data and RRC transmissions to disaggregated base stations in accordance with aspects of the present disclosure.

FIG. 4 illustrates an example of a process 400 that supports small data and RRC transmissions to disaggregated base stations in accordance with aspects of the present disclosure. In some examples, process 400 may implement aspects of wireless communication systems 100 and/or 200 and/or process 300. Aspects of process 400 may be implemented by UE 405 and/or base station 410, which may be examples of corresponding devices described herein. In some aspects, base station 410 may be a disaggregated base station implementing a CU/DU split architecture. That is, base station 410 may include a DU 415, a CU-CP 420, and/or a CU-UP 425, which may be examples of the corresponding devices described herein. Generally UE 405 and base station 410 may have a wireless connection established to support wireless communications.

At 430, UE 405 may transmit (and DU 415 of base station 410 may receive) a MAC PDU that includes both the data packet and a request to resume an active state for the wireless connection. In this context, DU 415 may be considered a first network node of base station 410. That is, UE 405 may transmit or otherwise convey an indication of an RRC resume request message that also includes uplink data to be communicated from UE 405. As discussed above, an existing RRC resume request message may be utilized to carry the data and/or a new RRC resume request message may be defined that carries the original RRC resume request information as well as the PDCP PDU with the user data. In some aspects, UE 405 may include the QFI in the PDCP PDU, even in the situation where the DRB only has one QoS flow. As discussed above, in some examples the RRC resume request message may include or otherwise convey an indication of the DRB identifier/LCID, PDCP PDU, and the like.

At 435, DU 415 may disassemble the RRC message and data. That is, DU 415 may separate the RRC message (e.g., the request to resume the active state for the wireless connection) and the data packet for the identified data. At 440, DU 415 may transmit or otherwise provide a data pending indication of the receive data packet to CU-CP 420. In some aspects, this may include DU 415 transmitting an initial uplink RRC message transfer to CU-CP 420 that carries or otherwise conveys an indication that uplink data from UE 405 is pending for communications (e.g., using one or more bits, fields, etc.). At 445, CU-CP 420 may transmit or otherwise provide a UE context setup request message to DU 415. In some aspects, the UE context setup request message may carry or otherwise convey an indication of a GTP-U uplink TEID, a tunnel address, and the like. At 450, DU 415 may transmit or otherwise provide a UE context setup response message to CU-CP 420. At 455, CU-CP 420 may transmit or otherwise provide a bearer context modification request message to CU-UP 425. In some aspects, the bearer context modification request message may convey a resume indication for the UE 405 to resume the active state for the wireless connection. At 460, CU-UP 425 may transmit or otherwise provide a bearer context response message to CU-CP 420. In some aspects, the features performed at 435 through 460 may be a part of DU 415 initiating an RRC resume procedure, where DU 415 indicates that data is pending to CU-CP 420 (and may also indicate the DRB identifier/LCID of the pending data).

At 465, DU 415 may transmit or otherwise provide the PDCP PDU to CU-UP 425. In this context, CU-UP 425 may be considered a second network node of base station 410. CU-UP 425 may process and then forward the data to UPF of the core network. For example, CU-UP 425 may decrypt the data using existing security keys and then forward the SDAP payload to UPF.

Figure 5:
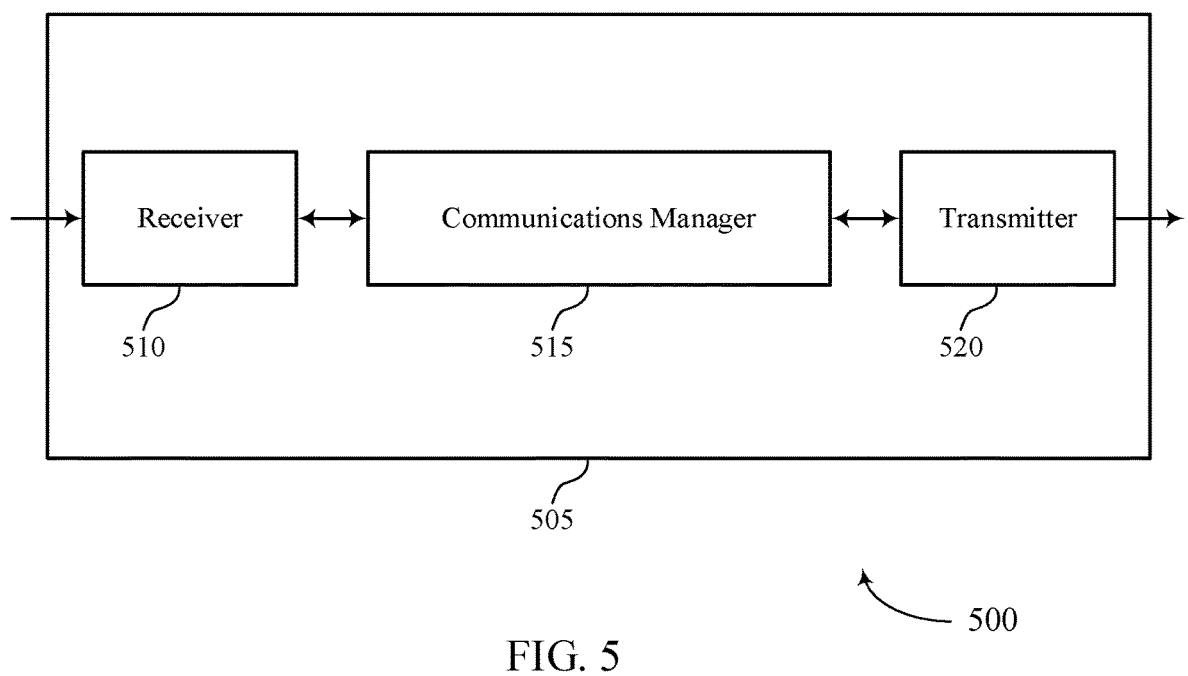
FIGS. 5 and 6 show block diagrams of devices that support small data and RRC transmissions to disaggregated base stations in accordance with aspects of the present disclosure.

FIG. 5 shows a block diagram 500 of a device 505 that supports small data and RRC transmissions to disaggregated base stations in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to small data and RRC transmissions to disaggregated base stations, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a wireless connection between the UE and a base station, identify, in an inactive state for the UE for the wireless connection, data to transmit to the base station, and transmit, in the inactive state, a MAC PDU, the MAC PDU including both a data packet for the identified data and a request to resume an active state for the wireless connection. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
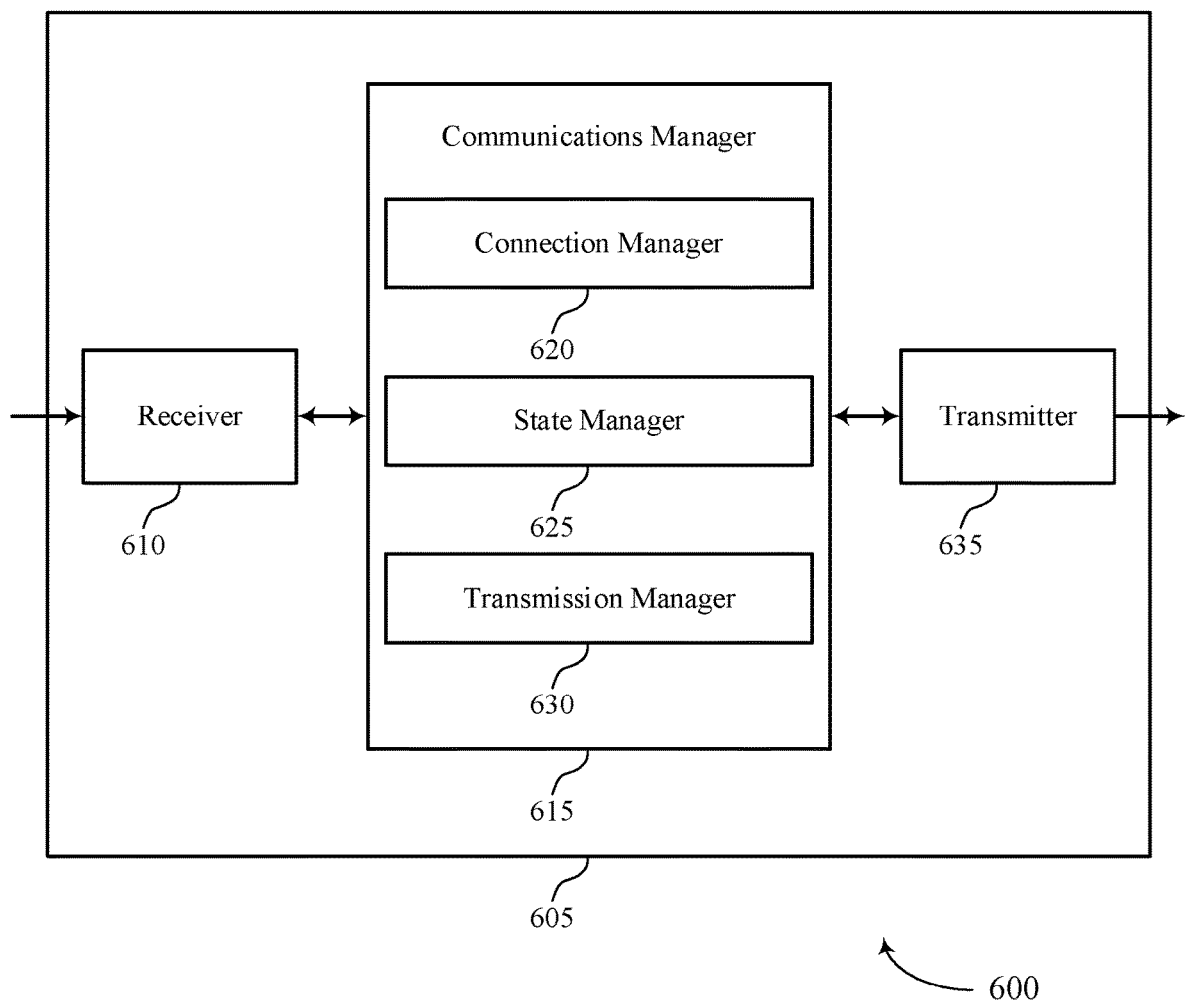

FIG. 6 shows a block diagram 600 of a device 605 that supports small data and RRC transmissions to disaggregated base stations in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to small data and RRC transmissions to disaggregated base stations, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection manager 620, a state manager 625, and a transmission manager 630. The communications manager 615 may be an example of aspects of the communications manager 810 described herein.

The connection manager 620 may establish a wireless connection between the UE and a base station.

The state manager 625 may identify, in an inactive state for the UE for the wireless connection, data to transmit to the base station.

The transmission manager 630 may transmit, in the inactive state, a MAC PDU, the MAC PDU including both a data packet for the identified data and a request to resume an active state for the wireless connection.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
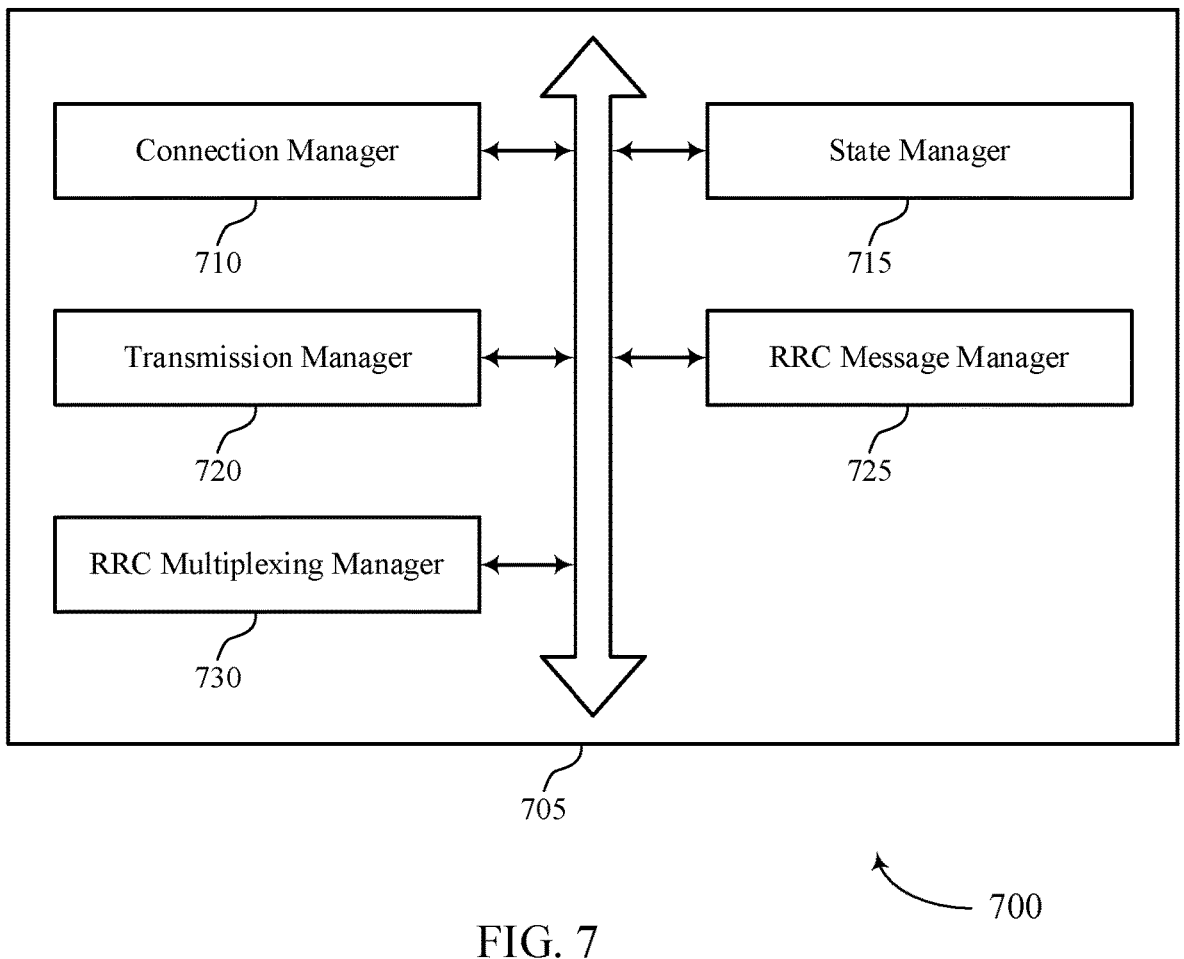
FIG. 7 shows a block diagram of a communications manager that supports small data and RRC transmissions to disaggregated base stations in accordance with aspects of the present disclosure.

FIG. 7 shows a block diagram 700 of a communications manager 705 that supports small data and RRC transmissions to disaggregated base stations in accordance with aspects of the present disclosure. The communications manager 705 may be an example of aspects of a communications manager 515, a communications manager 615, or a communications manager 810 described herein. The communications manager 705 may include a connection manager 710, a state manager 715, a transmission manager 720, a RRC message manager 725, and a RRC multiplexing manager 730. Each of these modules may communicate, directly or indirectly, with one another (e.g., via one or more buses).

The connection manager 710 may establish a wireless connection between the UE and a base station. In some cases, the wireless connection includes a RRC connection. In some cases, the inactive state includes a RRC inactive state. In some cases, the active state includes a RRC connected state.

The state manager 715 may identify, in an inactive state for the UE for the wireless connection, data to transmit to the base station.

The transmission manager 720 may transmit, in the inactive state, a MAC PDU, the MAC PDU including both a data packet for the identified data and a request to resume an active state for the wireless connection. In some cases, the MAC PDU is transmitted to a first network node of the base station with which the UE established the wireless connection, where the first network node includes a DU of the base station.

The RRC message manager 725 may transmit a resume request message that includes the request to resume the active state for the wireless connection and the data packet, the MAC PDU including the resume request message. In some examples, the RRC message manager 725 may transmit, in the MAC PDU, an identifier of a DRB associated with the data, or a LCID associated with the data, or both.

In some examples, the RRC message manager 725 may transmit a set of data packets in the MAC PDU, the set of data packets including the data packet. In some cases, the request to resume the active state for the wireless connection includes a first type of RRC resume request message. In some cases, the resume request message includes a second type of RRC resume request message. In some cases, the data packet includes a PDCP PDU.

The RRC multiplexing manager 730 may transmit a packet that includes the request to resume the active state for the wireless connection and the data packet, the MAC PDU including the packet. In some cases, the data packet includes a MAC sub-PDU that includes the data. In some cases, the request to resume the active state for the wireless connection includes a MAC sub-PDU that includes a RRC resume request message. In some cases, each data packet of the set of data packets is associated with an identifier of a DRB, or a LCID, or both.

Figure 8:
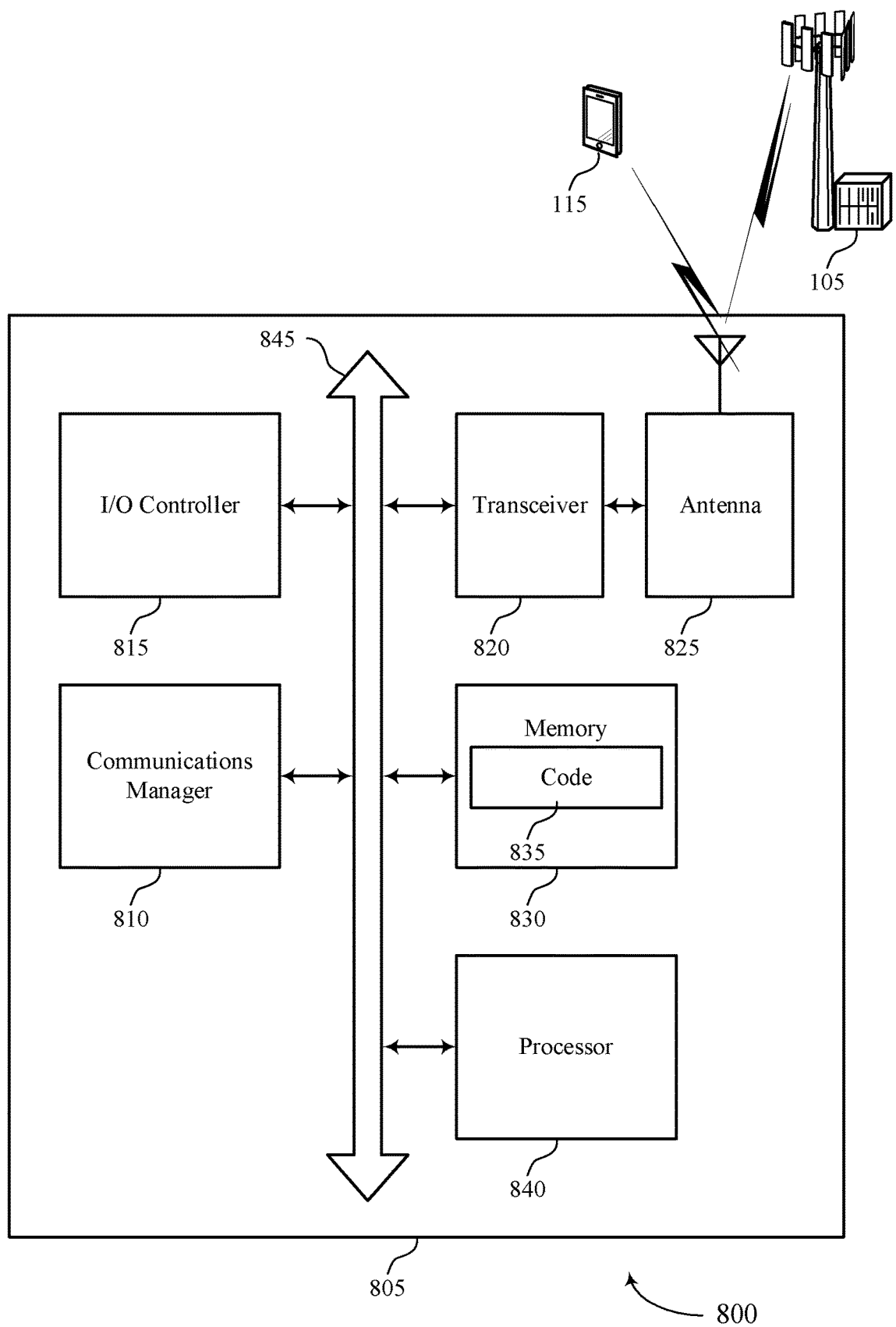
FIG. 8 shows a diagram of a system including a device that supports small data and RRC transmissions to disaggregated base stations in accordance with aspects of the present disclosure.

FIG. 8 shows a diagram of a system 800 including a device 805 that supports small data and RRC transmissions to disaggregated base stations in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a wireless connection between the UE and a base station, identify, in an inactive state for the UE for the wireless connection, data to transmit to the base station, and transmit, in the inactive state, a MAC PDU, the MAC PDU including both a data packet for the identified data and a request to resume an active state for the wireless connection.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting small data and RRC transmissions to disaggregated base stations).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
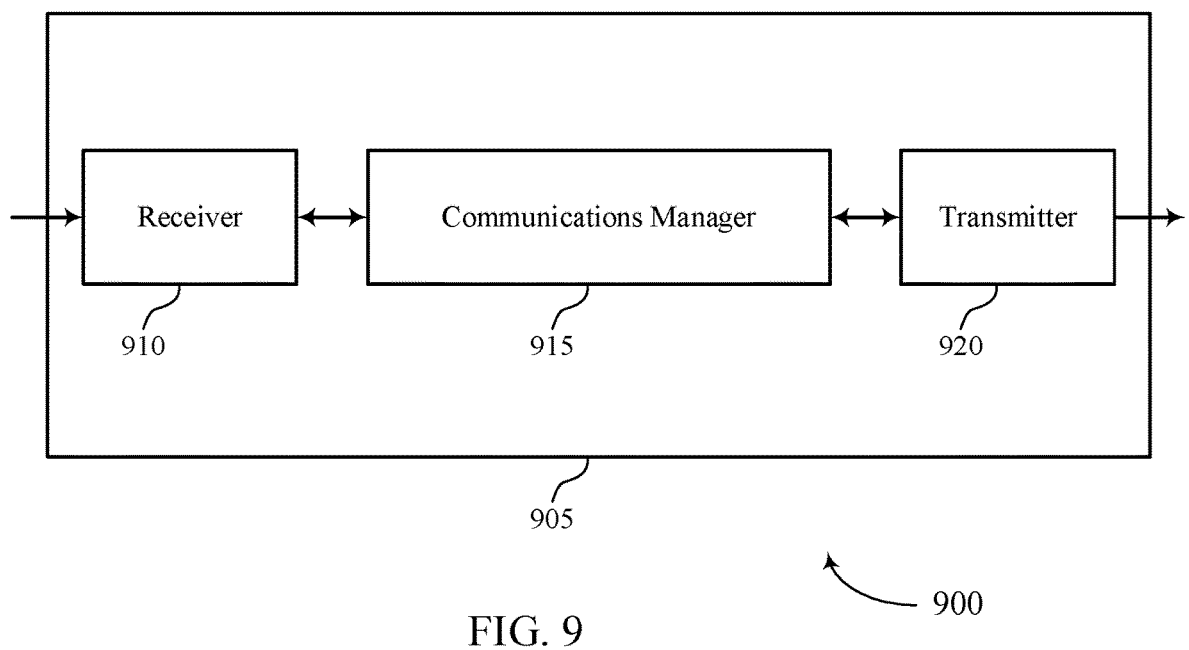
FIGS. 9 and 10 show block diagrams of devices that support small data and RRC transmissions to disaggregated base stations in accordance with aspects of the present disclosure.

FIG. 9 shows a block diagram 900 of a device 905 that supports small data and RRC transmissions to disaggregated base stations in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to small data and RRC transmissions to disaggregated base stations, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a wireless connection between the base station and a UE, receive, at a first network node of the base station and in an inactive state for the UE for the wireless connection, a MAC PDU from the UE, the MAC PDU including both a data packet and a request to resume an active state for the wireless connection, and transmit data of the received data packet to a second network node of the base station. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
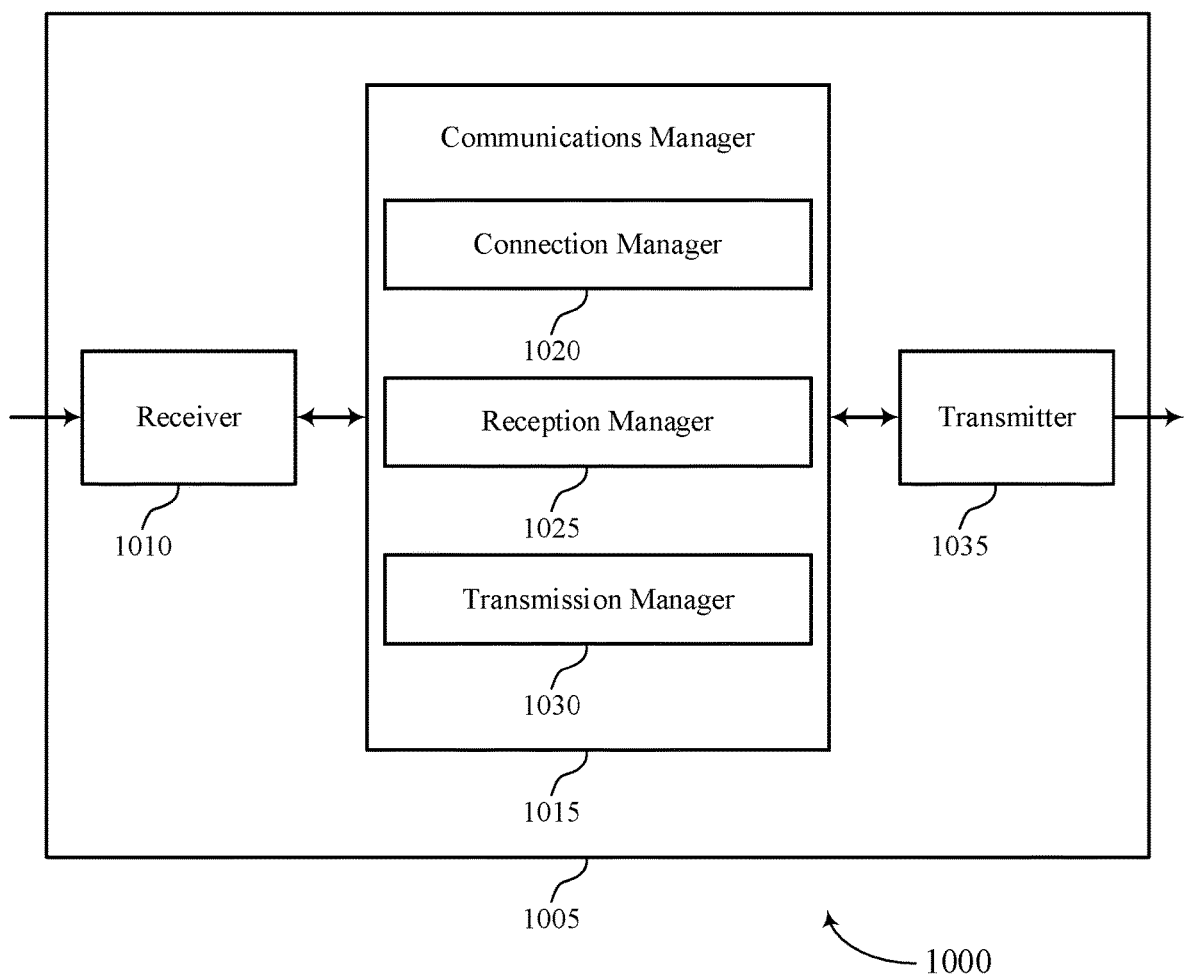

FIG. 10 shows a block diagram 1000 of a device 1005 that supports small data and RRC transmissions to disaggregated base stations in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to small data and RRC transmissions to disaggregated base stations, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection manager 1020, a reception manager 1025, and a transmission manager 1030. The communications manager 1015 may be an example of aspects of the communications manager 1210 described herein.

The connection manager 1020 may establish a wireless connection between the base station and a UE.

The reception manager 1025 may receive, at a first network node of the base station and in an inactive state for the UE for the wireless connection, a MAC PDU from the UE, the MAC PDU including both a data packet and a request to resume an active state for the wireless connection.

The transmission manager 1030 may transmit data of the received data packet to a second network node of the base station.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
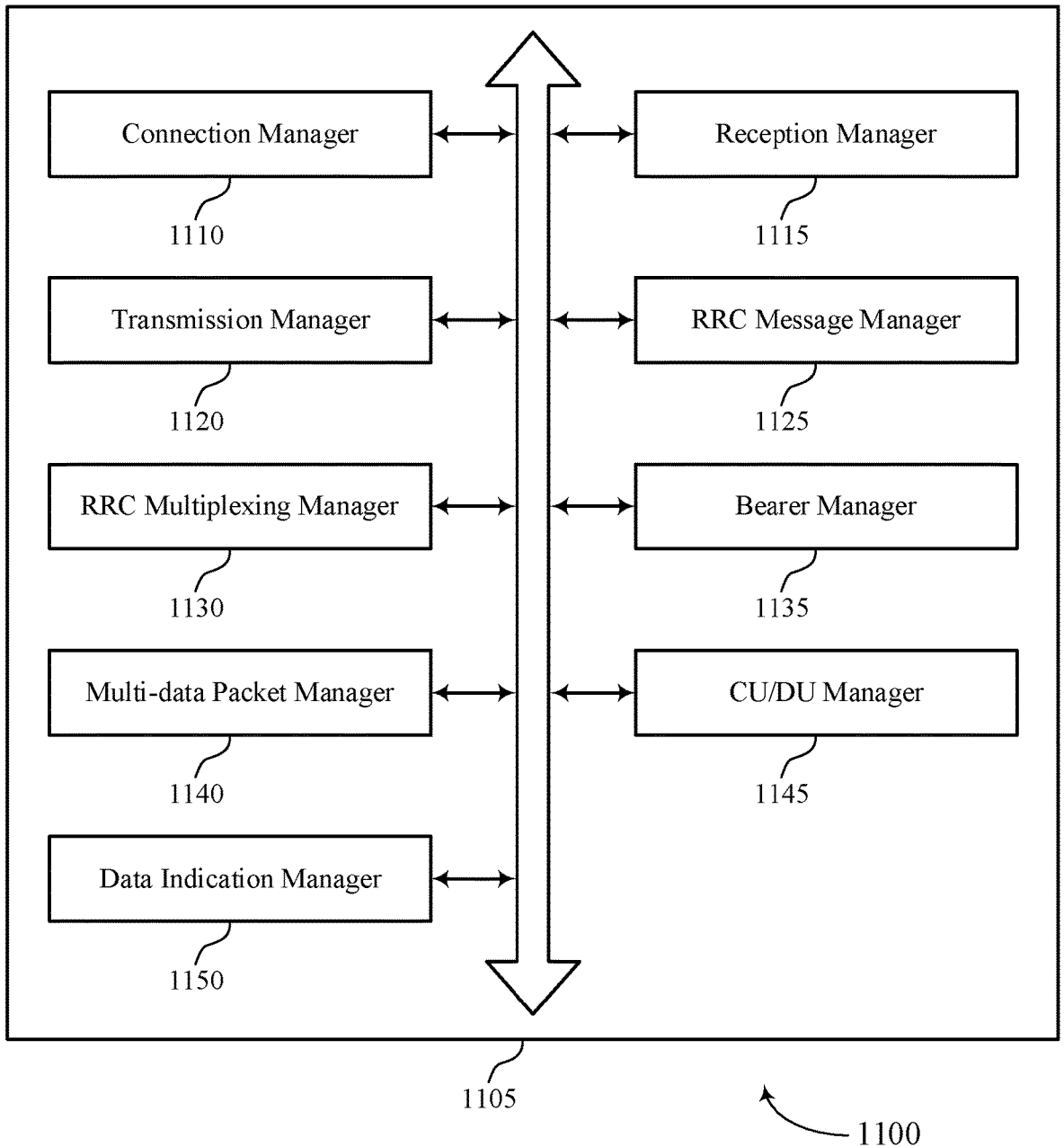
FIG. 11 shows a block diagram of a communications manager that supports small data and RRC transmissions to disaggregated base stations in accordance with aspects of the present disclosure.

FIG. 11 shows a block diagram 1100 of a communications manager 1105 that supports small data and RRC transmissions to disaggregated base stations in accordance with aspects of the present disclosure. The communications manager 1105 may be an example of aspects of a communications manager 915, a communications manager 1015, or a communications manager 1210 described herein. The communications manager 1105 may include a connection manager 1110, a reception manager 1115, a transmission manager 1120, a RRC message manager 1125, a RRC multiplexing manager 1130, a bearer manager 1135, a multi-data packet manager 1140, a CU/DU manager 1145, and a data indication manager 1150. Each of these modules may communicate, directly or indirectly, with one another (e.g., via one or more buses).

The connection manager 1110 may establish a wireless connection between the base station and a UE. In some cases, the wireless connection includes a RRC connection. In some cases, the inactive state includes a RRC inactive state. In some cases, the active state includes a RRC connected state.

The reception manager 1115 may receive, at a first network node of the base station and in an inactive state for the UE for the wireless connection, a MAC PDU from the UE, the MAC PDU including both a data packet and a request to resume an active state for the wireless connection.

The transmission manager 1120 may transmit data of the received data packet to a second network node of the base station.

The RRC message manager 1125 may receive a resume request message that includes the request to resume the active state for the wireless connection and the data packet, the MAC PDU including the resume request message. In some cases, the request to resume the active state for the wireless connection includes a first type of RRC resume request message. In some cases, the resume request message includes a second type of RRC resume request message. In some cases, the data packet includes a PDCP PDU.

The RRC multiplexing manager 1130 may receive a packet that includes the request to resume the active state for the wireless connection and the data packet, the MAC PDU including the packet. In some cases, the data packet includes a MAC sub-PDU that includes the data. In some cases, the request to resume the active state for the wireless connection includes a medium access control sub-PDU that includes a RRC resume request message.

The bearer manager 1135 may receive, in the MAC PDU, an identifier of a DRB associated with the data, or a LCID associated with the data, or both.

The multi-data packet manager 1140 may receive a set of data packets in the MAC PDU, the set of data packets including the data packet. In some cases, each data packet of the set of data packets is associated with an identifier of a DRB, or a LCID, or both.

The CU/DU manager 1145 may forward the received data packet to a central unit of the base station, the second network node including the central unit. In some examples, the CU/DU manager 1145 may forwards the recovered data to a user-plane function of the network. In some examples, the CU/DU manager 1145 may read a quality-of-service flow identifier from the data packet. In some examples, the CU/DU manager 1145 may derive a DRB identifier for the data packet based on the quality-of-service flow identifier.

In some examples, the CU/DU manager 1145 may decipher the data packet based on the DRB identifier and a security context associated with the UE. In some cases, the central unit includes a central unit control-plane of the base station, and the central unit control-plane forwards the received data packet from the central unit control-plane to a central unit user-plane of the base station. In some cases, the central unit includes a central unit user-plane of the base station that processes the received data packet to recover the data.

The data indication manager 1150 may transmit, to the second network node, a message indicating the request to resume the active state for the wireless connection, the message including an indication of the data of the received data packet, where the data of the received data packet is transmitted to the second network node based on the indication of the data. In some cases, the message further includes an identifier of a DRB associated with the data, or a LCID associated with the data, or both.

Figure 12:
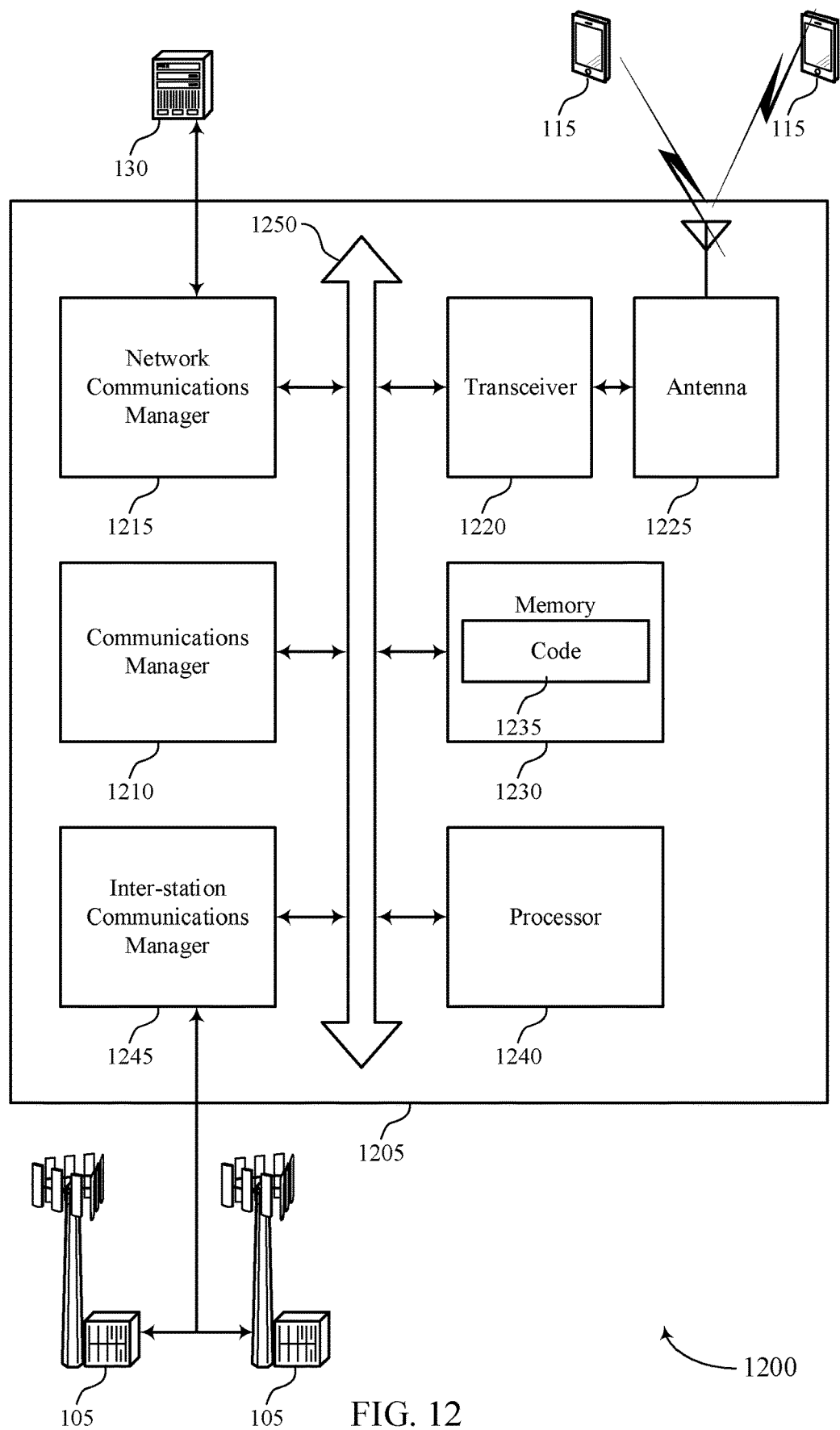
FIG. 12 shows a diagram of a system including a device that supports small data and RRC transmissions to disaggregated base stations in accordance with aspects of the present disclosure.

FIG. 12 shows a diagram of a system 1200 including a device 1205 that supports small data and RRC transmissions to disaggregated base stations in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a wireless connection between the base station and a UE, receive, at a first network node of the base station and in an inactive state for the UE for the wireless connection, a MAC PDU from the UE, the MAC PDU including both a data packet and a request to resume an active state for the wireless connection, and transmit data of the received data packet to a second network node of the base station.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting small data and RRC transmissions to disaggregated base stations).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
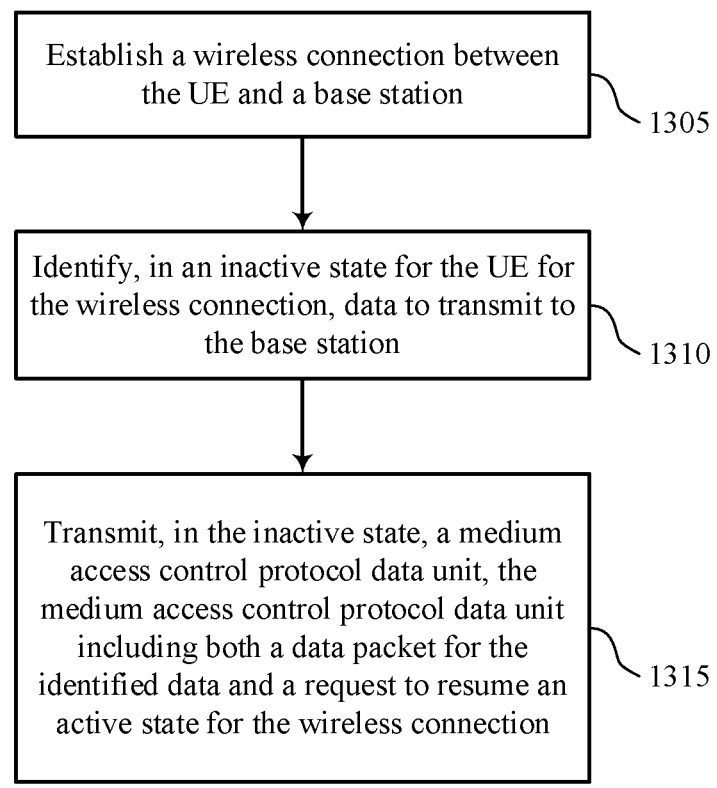
FIGS. 13 through 17 show flowcharts illustrating methods that support small data and RRC transmissions to disaggregated base stations in accordance with aspects of the present disclosure.

FIG. 13 shows a flowchart illustrating a method 1300 that supports small data and RRC transmissions to disaggregated base stations in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may establish a wireless connection between the UE and a base station. The operations of 1305 may be performed according to the methods described herein. In some examples, aspects of the operations of 1305 may be performed by a connection manager as described with reference to FIGS. 5 through 8.

At 1310, the UE may identify, in an inactive state for the UE for the wireless connection, data to transmit to the base station. The operations of 1310 may be performed according to the methods described herein. In some examples, aspects of the operations of 1310 may be performed by a state manager as described with reference to FIGS. 5 through 8.

At 1315, the UE may transmit, in the inactive state, a MAC PDU, the MAC PDU including both a data packet for the identified data and a request to resume an active state for the wireless connection. The operations of 1315 may be performed according to the methods described herein. In some examples, aspects of the operations of 1315 may be performed by a transmission manager as described with reference to FIGS. 5 through 8.

Figure 14:
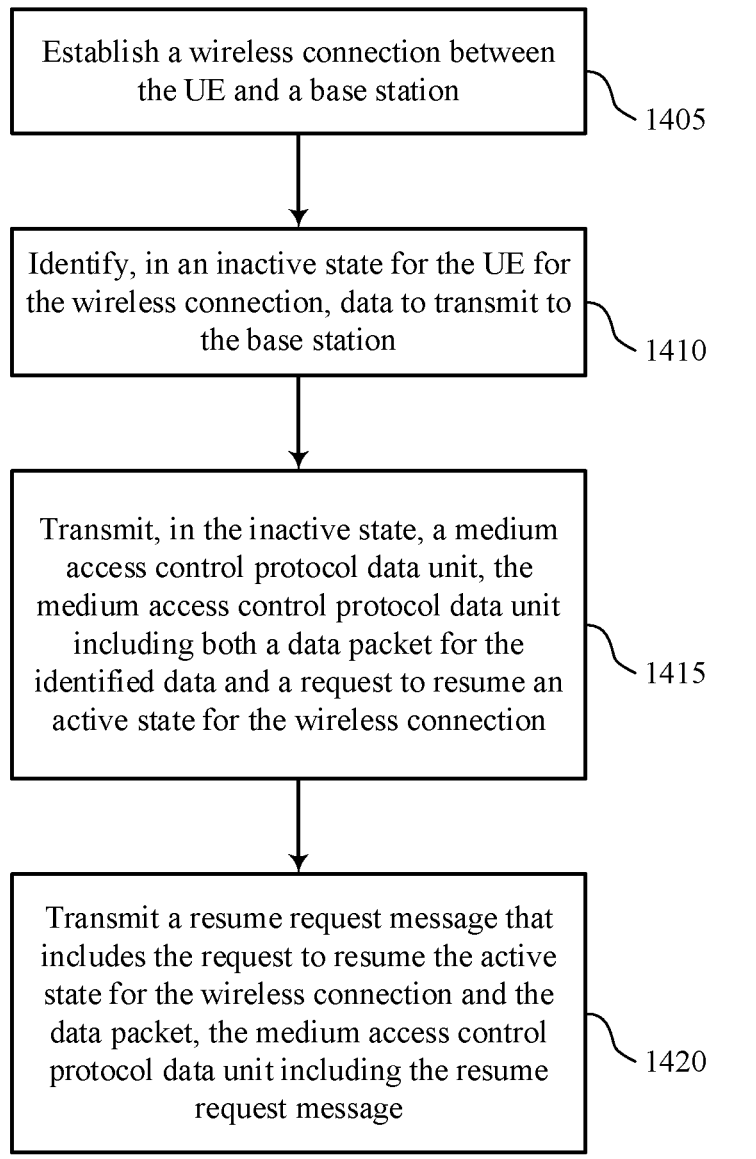

FIG. 14 shows a flowchart illustrating a method 1400 that supports small data and RRC transmissions to disaggregated base stations in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may establish a wireless connection between the UE and a base station. The operations of 1405 may be performed according to the methods described herein. In some examples, aspects of the operations of 1405 may be performed by a connection manager as described with reference to FIGS. 5 through 8.

At 1410, the UE may identify, in an inactive state for the UE for the wireless connection, data to transmit to the base station. The operations of 1410 may be performed according to the methods described herein. In some examples, aspects of the operations of 1410 may be performed by a state manager as described with reference to FIGS. 5 through 8.

At 1415, the UE may transmit, in the inactive state, a MAC PDU, the MAC PDU including both a data packet for the identified data and a request to resume an active state for the wireless connection. The operations of 1415 may be performed according to the methods described herein. In some examples, aspects of the operations of 1415 may be performed by a transmission manager as described with reference to FIGS. 5 through 8.

At 1420, the UE may transmit a resume request message that includes the request to resume the active state for the wireless connection and the data packet, the MAC PDU including the resume request message. The operations of 1420 may be performed according to the methods described herein. In some examples, aspects of the operations of 1420 may be performed by a RRC message manager as described with reference to FIGS. 5 through 8.

Figure 15:
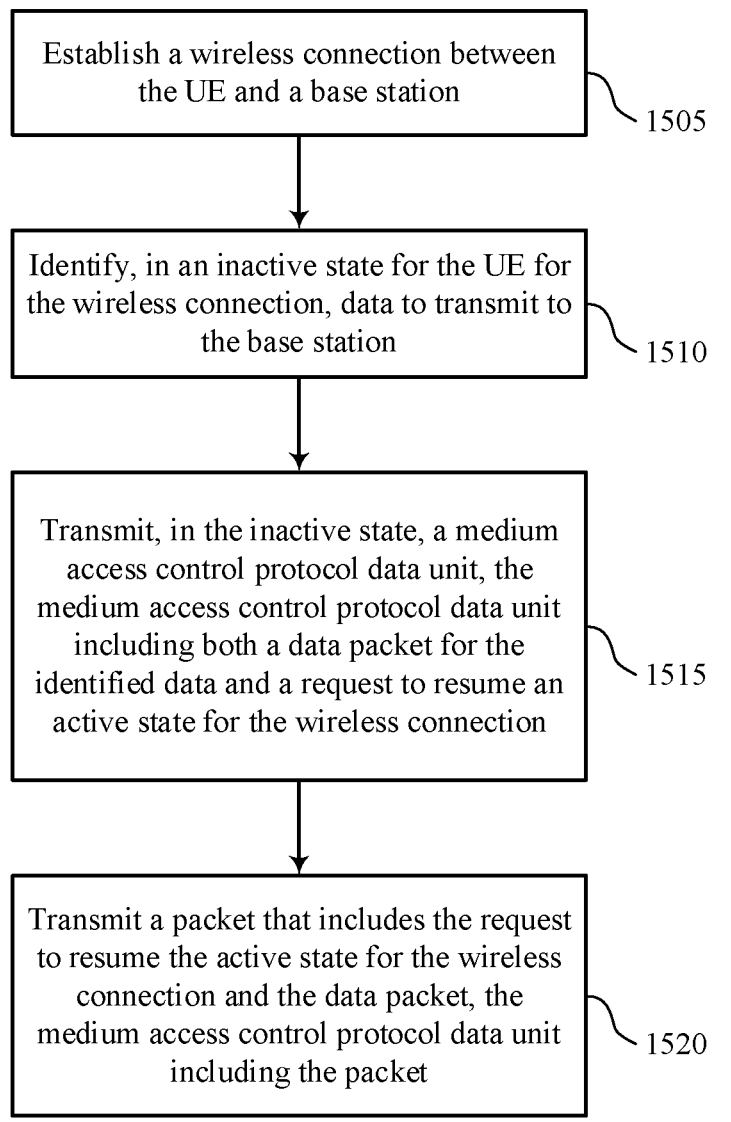

FIG. 15 shows a flowchart illustrating a method 1500 that supports small data and RRC transmissions to disaggregated base stations in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may establish a wireless connection between the UE and a base station. The operations of 1505 may be performed according to the methods described herein. In some examples, aspects of the operations of 1505 may be performed by a connection manager as described with reference to FIGS. 5 through 8.

At 1510, the UE may identify, in an inactive state for the UE for the wireless connection, data to transmit to the base station. The operations of 1510 may be performed according to the methods described herein. In some examples, aspects of the operations of 1510 may be performed by a state manager as described with reference to FIGS. 5 through 8.

At 1515, the UE may transmit, in the inactive state, a MAC PDU, the MAC PDU including both a data packet for the identified data and a request to resume an active state for the wireless connection. The operations of 1515 may be performed according to the methods described herein. In some examples, aspects of the operations of 1515 may be performed by a transmission manager as described with reference to FIGS. 5 through 8.

At 1520, the UE may transmit a packet that includes the request to resume the active state for the wireless connection and the data packet, the MAC PDU including the packet. The operations of 1520 may be performed according to the methods described herein. In some examples, aspects of the operations of 1520 may be performed by a RRC multiplexing manager as described with reference to FIGS. 5 through 8.

Figure 16:
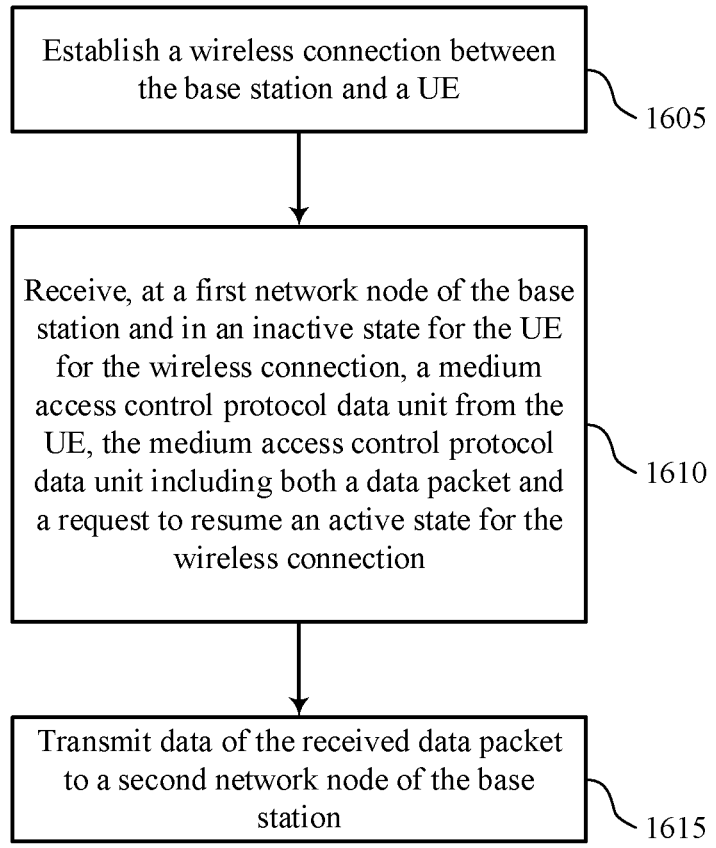

FIG. 16 shows a flowchart illustrating a method 1600 that supports small data and RRC transmissions to disaggregated base stations in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may establish a wireless connection between the base station and a UE. The operations of 1605 may be performed according to the methods described herein. In some examples, aspects of the operations of 1605 may be performed by a connection manager as described with reference to FIGS. 9 through 12.

At 1610, the base station may receive, at a first network node of the base station and in an inactive state for the UE for the wireless connection, a MAC PDU from the UE, the MAC PDU including both a data packet and a request to resume an active state for the wireless connection. The operations of 1610 may be performed according to the methods described herein. In some examples, aspects of the operations of 1610 may be performed by a reception manager as described with reference to FIGS. 9 through 12.

At 1615, the base station may transmit data of the received data packet to a second network node of the base station. The operations of 1615 may be performed according to the methods described herein. In some examples, aspects of the operations of 1615 may be performed by a transmission manager as described with reference to FIGS. 9 through 12.

Figure 17:
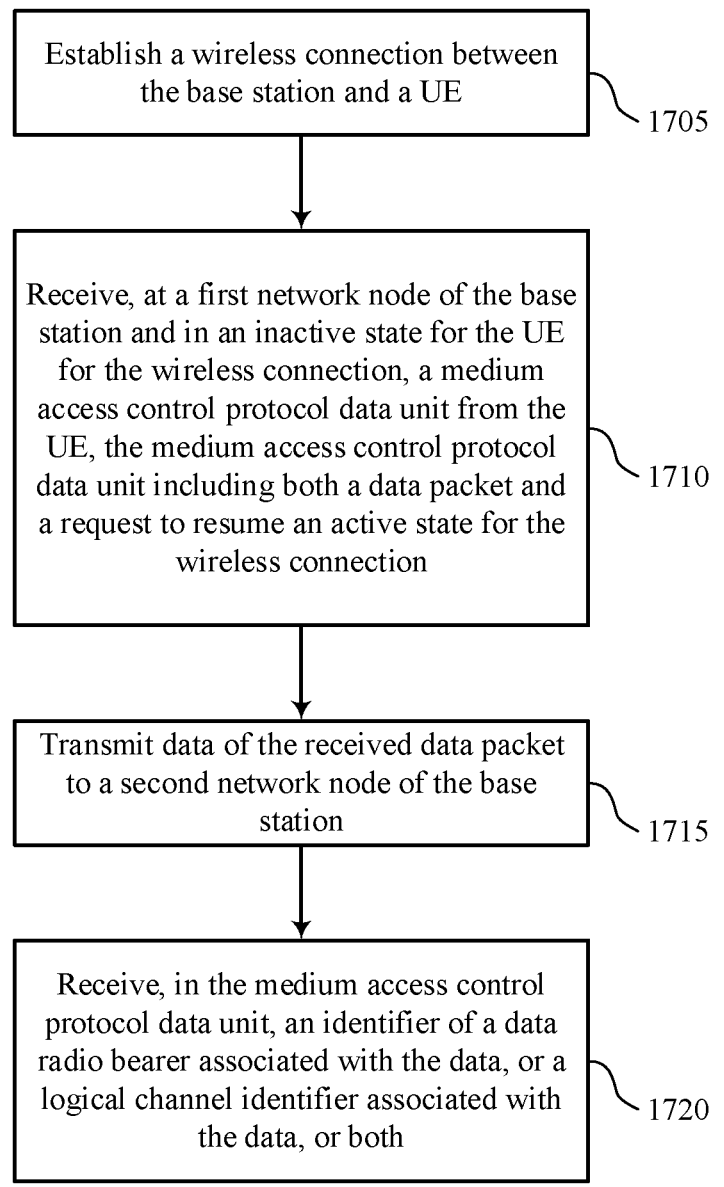

FIG. 17 shows a flowchart illustrating a method 1700 that supports small data and RRC transmissions to disaggregated base stations in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may establish a wireless connection between the base station and a UE. The operations of 1705 may be performed according to the methods described herein. In some examples, aspects of the operations of 1705 may be performed by a connection manager as described with reference to FIGS. 9 through 12.

At 1710, the base station may receive, at a first network node of the base station and in an inactive state for the UE for the wireless connection, a MAC PDU from the UE, the MAC PDU including both a data packet and a request to resume an active state for the wireless connection. The operations of 1710 may be performed according to the methods described herein. In some examples, aspects of the operations of 1710 may be performed by a reception manager as described with reference to FIGS. 9 through 12.

At 1715, the base station may transmit data of the received data packet to a second network node of the base station. The operations of 1715 may be performed according to the methods described herein. In some examples, aspects of the operations of 1715 may be performed by a transmission manager as described with reference to FIGS. 9 through 12.

At 1720, the base station may receive, in the MAC PDU, an identifier of a DRB associated with the data, or a LCID associated with the data, or both. The operations of 1720 may be performed according to the methods described herein. In some examples, aspects of the operations of 1720 may be performed by a bearer manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) comprising:
    establishing a wireless connection between the UE and a base station;
    identifying, in an inactive state for the UE for the wireless connection, data to transmit to the base station; and
    transmitting, in the inactive state, a data unit, the data unit comprising both a data packet for the identified data and a request to resume an active state for the wireless connection, wherein a format of the request indicates that the data unit carries small data, the small data comprising the identified data.

2. The method of claim 1, wherein transmitting the data unit comprises:
    transmitting a resume request message that comprises the request to resume the active state for the wireless connection and the data packet, the data unit comprising the resume request message.

3. The method of claim 2, wherein:
    the request to resume the active state for the wireless connection comprises a first type of radio resource control resume request message; and
    the resume request message comprises a second type of radio resource control resume request message.

4. The method of claim 2, further comprising:
    transmitting, in the data unit, an identifier of a data radio bearer associated with the data, or a logical channel identifier associated with the data, or both.

5. The method of claim 2, wherein transmitting the data unit comprises:
    transmitting a set of data packets in the data unit, the set of data packets including the data packet.

6. The method of claim 5, wherein each data packet of the set of data packets is associated with an identifier of a data radio bearer, or a logical channel identifier, or both.

7. The method of claim 2, wherein the data packet comprises a packet data convergence protocol protocol data unit.

8. The method of claim 1, wherein transmitting the data unit comprises:
    transmitting a packet that comprises the request to resume the active state for the wireless connection and the data packet, the data unit comprising the packet.

9. The method of claim 8, wherein the data packet comprises a media access control sub-protocol data unit that includes the data.

10. The method of claim 8, wherein the request to resume the active state for the wireless connection comprises a media access control sub-protocol data unit that includes a radio resource control resume request message.

11. The method of claim 1, wherein the data unit is transmitted to a first network node of the base station with which the UE established the wireless connection, wherein the first network node comprises a distributed unit of the base station.

12. The method of claim 1, wherein:
    the wireless connection comprises a radio resource control connection;
    the inactive state comprises a radio resource control inactive state; and
    the active state comprises a radio resource control connected state.

13. A method for wireless communication at a base station comprising:
    establishing a wireless connection between the base station and a user equipment (UE);
    receiving, at a first network node of the base station and in an inactive state for the UE for the wireless connection, a data unit from the UE, the data unit comprising both a data packet and a request to resume an active state for the wireless connection, wherein a format of the request indicates that the data unit carries small data; and
    transmitting data of the received data packet to a second network node of the base station.

14. The method of claim 13, wherein receiving the data unit comprises:
    receiving a resume request message that comprises the request to resume the active state for the wireless connection and the data packet, the data unit comprising the resume request message.

15. The method of claim 14, wherein:
    the request to resume the active state for the wireless connection comprises a first type of radio resource control resume request message; and
    the resume request message comprises a second type of radio resource control resume request message.

16. The method of claim 14, wherein the data packet comprises a packet data convergence protocol protocol data unit.

17. The method of claim 13, wherein receiving the data unit comprises:
    receiving a packet that comprises the request to resume the active state for the wireless connection and the data packet, the data unit comprising the packet.

18. The method of claim 17, wherein the data packet comprises a media access control sub-protocol data unit that includes the data.

19. The method of claim 17, wherein the request to resume the active state for the wireless connection comprises a medium access control sub-protocol data unit that includes a radio resource control resume request message.

20. The method of claim 13, further comprising:
receiving, in the data unit, an identifier of a data radio bearer associated with the data, or a logical channel identifier associated with the data, or both.

21. The method of claim 13, wherein receiving the data unit comprises:
receiving a set of data packets in the data unit, the set of data packets including the data packet.

22. The method of claim 21, wherein each data packet of the set of data packets is associated with an identifier of a data radio bearer, or a logical channel identifier, or both.

23. The method of claim 13, wherein the first network node comprises a distributed unit of the base station, and transmitting the data comprises:
forwarding the received data packet to a central unit of the base station, the second network node comprising the central unit.

24. The method of claim 23, wherein the central unit comprises a central unit control-plane of the base station, and the central unit control-plane forwards the received data packet from the central unit control-plane to a central unit user-plane of the base station.

25. The method of claim 23, wherein:
the central unit comprises a central unit user-plane of the base station that processes the received data packet to recover the data; and
forwards the recovered data to a user-plane function of a network.

26. The method of claim 25, wherein processing the received data packet to recover the data comprises:
reading a quality-of-service flow identifier from the data packet;
deriving a data radio bearer identifier for the data packet based at least in part on the quality-of-service flow identifier; and
deciphering the data packet based at least in part on the data radio bearer identifier and a security context associated with the UE.

27. The method of claim 13, further comprising:
transmitting, to the second network node, a message indicating the request to resume the active state for the wireless connection, the message including an indication of the data of the received data packet, wherein the data of the received data packet is transmitted to the second network node based at least in part on the indication of the data.

28. The method of claim 27, wherein the message further includes an identifier of a data radio bearer associated with the data, or a logical channel identifier associated with the data, or both.

29. The method of claim 13, wherein:
the wireless connection comprises a radio resource control connection;
the inactive state comprises a radio resource control inactive state; and
the active state comprises a radio resource control connected state.

30. An apparatus for wireless communication at a user equipment (UE) comprising:
one or more processors,
one or more memories coupled with the one or more processors; and
instructions stored in the one or more memories and executable by the one or more processors to cause the apparatus to:
establish a wireless connection between the UE and a base station;
identify, in an inactive state for the UE for the wireless connection, data to transmit to the base station; and
transmit, in the inactive state, a data unit, the data unit comprising both a data packet for the identified data and a request to resume an active state for the wireless connection, wherein a format of the request indicates that the data unit carries small data, the small data comprising the identified data.

31. The apparatus of claim 30, wherein the instructions to transmit the data unit are executable by the one or more processors to cause the apparatus to:
transmit a resume request message that comprises the request to resume the active state for the wireless connection and the data packet, the data unit comprising the resume request message.

32. The apparatus of claim 31, wherein:
the request to resume the active state for the wireless connection comprises a first type of radio resource control resume request message; and
the resume request message comprises a second type of radio resource control resume request message.

33. The apparatus of claim 31, wherein the instructions are further executable by the one or more processors to cause the apparatus to:
transmit, in the data unit, an identifier of a data radio bearer associated with the data, or a logical channel identifier associated with the data, or both.

34. An apparatus for wireless communication at a base station comprising:
one or more processors,
one or more memories coupled with the one or more processors; and
instructions stored in the one or more memories and executable by the one or more processors to cause the apparatus to:
establish a wireless connection between the base station and a user equipment (UE);
receive, at a first network node of the base station and in an inactive state for the UE for the wireless connection, a data unit from the UE, the data unit comprising both a data packet and a request to resume an active state for the wireless connection, wherein a format of the request indicates that the data unit carries small data; and
transmit data of the received data packet to a second network node of the base station.

35. The apparatus of claim 34, wherein the instructions to receive the data unit are executable by the one or more processors to cause the apparatus to:
receive a resume request message that comprises the request to resume the active state for the wireless connection and the data packet, the data unit comprising the resume request message.

* * * * *